(12) United States Patent
Nakamura

(10) Patent No.: US 10,701,220 B2
(45) Date of Patent: Jun. 30, 2020

(54) IMAGE PRINT PROPOSAL DEVICE, METHOD, AND PROGRAM

(71) Applicant: FUJIFILM Corporation, Tokyo (JP)

(72) Inventor: Sanshiro Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/195,347

(22) Filed: Nov. 19, 2018

(65) Prior Publication Data

US 2019/0199864 A1   Jun. 27, 2019

(30) Foreign Application Priority Data

Dec. 27, 2017   (JP) .................................. 2017-251806

(51) Int. Cl.
*H04N 1/00* (2006.01)
*G06F 3/14* (2006.01)

(52) U.S. Cl.
CPC ..... *H04N 1/00161* (2013.01); *H04N 1/00143* (2013.01); *H04N 1/00251* (2013.01); *H04N 1/00328* (2013.01)

(58) Field of Classification Search
None
See application file for complete search history.

(56) References Cited

U.S. PATENT DOCUMENTS

| | | | | |
|---|---|---|---|---|
| 5,208,903 A * | 5/1993 | Curry | .................... | G06F 3/0481 345/594 |
| 6,047,130 A * | 4/2000 | Oles | ........................ | G03B 15/00 348/64 |
| 7,062,722 B1 * | 6/2006 | Carlin | .................... | G06Q 30/02 715/781 |
| 2001/0034668 A1 * | 10/2001 | Whitworth | ............. | G06Q 30/06 705/26.3 |
| 2002/0158884 A1 * | 10/2002 | Gonzalez | ................. | G06F 3/14 345/593 |
| 2004/0130626 A1 * | 7/2004 | Ouchi | ................ | H04N 1/00323 348/207.1 |
| 2007/0143082 A1 * | 6/2007 | Degnan | ................... | G06T 11/60 703/1 |
| 2012/0194555 A1 * | 8/2012 | Byrnes | ............... | G06F 17/5004 345/634 |

(Continued)

FOREIGN PATENT DOCUMENTS

| | | |
|---|---|---|
| JP | 2004-318359 A | 11/2004 |
| JP | 2007-047946 A | 2/2007 |
| JP | 2007-193554 A | 8/2007 |

*Primary Examiner* — Beniyam Menberu
(74) *Attorney, Agent, or Firm* — Studebaker & Brackett PC

(57) ABSTRACT

An image print proposal device, method, and program capable of proposing an image print suitable to be decorated in a wall of a room to a user are provided. An image print proposal device includes an image acquisition unit that acquires an image of a room captured by a user, a selection unit that selects an image corresponding to an image print suitable for an image print to be decorated in the room from among images in a group registered in advance or images in a group possessed by the user on the basis of the acquired image of the room, and an image processing unit and a display functioning as a proposal unit that proposes the selected image to the user as an image corresponding to the image print to be decorated in the room.

20 Claims, 15 Drawing Sheets

(56) References Cited

U.S. PATENT DOCUMENTS

| | | | |
|---|---|---|---|
| 2014/0304661 A1* | 10/2014 | Topakas | G06F 3/04815 715/848 |
| 2015/0332622 A1* | 11/2015 | Liu | G09G 3/2003 705/14.54 |
| 2016/0063735 A1* | 3/2016 | Furuya | G06K 9/00691 382/164 |
| 2016/0300290 A1* | 10/2016 | Bhardwaj | G06Q 30/0631 |
| 2017/0132694 A1* | 5/2017 | Damy | G06Q 30/0643 |

* cited by examiner

IMAGE PRINT PROPOSAL DEVICE, METHOD, AND PROGRAM

CROSS-REFERENCE TO RELATED APPLICATIONS

The present application claims priority under 35 U.S.C. § 119 to Japanese Patent Application No. 2017-251806, filed on Dec. 27, 2017. Each of the above application(s) is hereby expressly incorporated by reference, in its entirety, into the present application.

BACKGROUND OF THE INVENTION

1. Field of the Invention

The present invention relates to an image print proposal device, method, and program, and more particularly, to a technique for proposing an image print suitable to be decorated in a room to a user.

2. Description of the Related Art

In the related art, a product sales device which enables purchasing a product while checking an atmosphere or harmony at the time of placing a purchase consideration product in an actual room or checking whether or not the product is fitted to a size of the room has been proposed (JP2004-318359A).

This product sales device combines a product image obtained by imaging a product with a room image obtained by imaging a room of the user, and guides and outputs a combination image to a customer. In particular, in a case where the product sales device combines the product image with the room image, the product sales device adjusts an image size according to a ratio of the size of the room in which the product is installed to a size of the product and rotates the product image according to an imaging direction in which the room is imaged, so that an orientation of the product image is adjusted in the imaging direction of the room image and the product image is combined and arranged in the room image.

Accordingly, the user can purchase the product while checking the atmosphere or harmony in a case where the purchase consideration product is placed in the actual room or checking whether or not the product is fitted to the size of the room.

Similarly, a product purchase assistance system described in JP2007-193554A combines an image of a scheduled purchase product that a user desires to purchase with an installation area in a room image provided by the user or a room image selected from a number of types of room models prepared in advance, and displays a resultant image, thereby facilitating selection of a product optimal to the installation place.

Further, in an order curtain sales system described in JP2007-047946A, in a case where a user selects a type or fabric of a curtain, a window frame (curtain) is measured from an image of a room in which the curtain is placed, the image of the room and an image of the curtain are combined and displayed on a terminal of the user, and an order is received from the user in a case where the user likes the curtain.

SUMMARY OF THE INVENTION

The product sales device described in JP2004-318359A displays a list of groups of product images, acquires an image of the room of the user in which the purchase consideration product is to be placed in a case where the user selects and designates the purchase consideration product from among the product images in the groups, and combines and arranges the product image of the purchase consideration product with and in the room image. The product sales device itself does not propose a product suitable for the room of the user.

Similarly, in the product purchase assistance system described in JP2007-193554A and the order curtain sales system described in JP2007-047946A, the curtain and other scheduled purchase items are selected by the user, and the system does not automatically select a product and propose the product to the user.

The present invention has been made in view of such circumstances, and an object of the present invention is to provide an image print proposal device, method, and program capable of proposing an image print suitable to be decorated in a wall of a room to a user.

In order to achieve the above object, an image print proposal device according to an aspect of the present invention includes an image acquisition unit that acquires an image of a room captured by a user; a selection unit that selects an image corresponding to an image print suitable for an image print to be decorated in the room from among images in a group registered in advance or images in a group possessed by the user on the basis of the acquired image of the room; and a proposal unit that proposes the selected image to the user as the image corresponding to the image print to be decorated in the room.

According to an aspect of the present invention, the image corresponding to the image print suitable for the image print to be decorated in the room is automatically selected on the basis of the image of the room captured by the user, and the selected image is proposed (presented) to the user. By presenting the selected "image", the "image print" corresponding to the selected image is proposed. Accordingly, in a case where the user desires to decorate a photograph (image print) on the wall of the room, the user can easily select an image print suitable for the room even in a case where the user does not know what type of image print is harmonized with, for example, an atmosphere of the room.

In the image print proposal device according to another aspect of the present invention, it is preferable for the selection unit to include a room parameter acquisition unit that analyzes the acquired image of the room and acquires a room parameter indicating a feature of the room; and an image extraction unit that extracts an image corresponding to an image print suitable for an image print to be decorated on a wall of the room from among the images in the group registered in advance or the images in the group possessed by the user on the basis of the acquired room parameter.

According to another aspect of the present invention, the room parameter indicating the feature of the room is acquired from the room image. The room parameter includes a type of room, a size of the room (a wall), an orientation of the room, a shape of the room, a color of the room, and brightness of the room. The image extraction unit extracts the image corresponding to an image print suitable for an image print to be decorated on the wall of the room on the basis of the acquired room parameter from among the images in the group.

In the image print proposal device according to still another aspect of the present invention, it is preferable for the room parameter acquisition unit to be a first machine learning unit caused to learn acquisition of the room parameter on the basis of an image group of a room for learning and a room parameter group for a teacher indicating the feature of the group of images of the room, and to acquire the room parameter indicating the feature of the room from the first machine learning unit on the basis of the acquired image of the room. The room parameter acquisition unit acquires the corresponding room parameter from the first machine learning unit on the basis of the acquired room image.

In the image print proposal device according to still another aspect of the present invention, it is preferable for the selection unit to include a storage unit that stores a relationship between a room parameter group indicating a feature of a room and an image parameter group indicating a feature of an image print group suitable for the image print to be decorated on the wall of the room, and for the image extraction unit to acquire the image parameter corresponding to the room parameter from the storage unit on the basis of the room parameter acquired by the room parameter acquisition unit, and to extract an image corresponding to an image print suitable for an image print to be decorated on the wall of the room from among the images in the group registered in advance or the images in the group possessed by the user on the basis of the acquired image parameter. The image extraction unit can acquire the image parameter corresponding to the room parameter from the storage unit on the basis of the acquired room parameter and extract the image corresponding to the image print suitable for the image print to decorated on the wall of the room from among the images in the group on the basis of the acquired image parameter. As the image parameter, an image size, number of frames, a frame design, a type of content, a type of user image, and the like are conceivable, in addition to various feature quantities obtained by analyzing an image.

In the image print proposal device according to still another aspect of the present invention, it is preferable for the image extraction unit to include a second machine learning unit caused to learn acquisition of an image parameter indicating the feature of the image print suitable for an image print to be decorated on the wall of the room on the basis of the room parameter group for learning indicating the feature of the room and the image parameter group for a teacher indicating the feature of the image print group, and to acquire the image parameter corresponding to the room parameter from the second machine learning unit on the basis of the room parameter acquired by the room parameter acquisition unit, and extracts an image corresponding to an image print suitable for an image print to be decorated on the wall of the room from among the images in the group registered in advance or the images in the group possessed by the user on the basis of the acquired image parameter. The image extraction unit can acquire the image parameter corresponding to the room parameter from the second machine learning unit and extract the image corresponding to the image print suitable for the image print to decorated on the wall of the room from among the images in the group on the basis of the acquired image parameter.

In the image print proposal device according to still another aspect of the present invention, it is preferable for the selection unit to include a third machine learning unit caused to learn acquisition of an image parameter indicating the feature of the image print suitable for an image print to be decorated on a wall of the room on the basis of the image group of the room for learning and the image parameter group for a teacher indicating the feature of the image print group, and to acquire the image parameter indicating the feature of the image print suitable for the image print to be decorated on the room from the third machine learning unit on the basis of the acquired image of the room, and selects an image corresponding to an image print suitable for an image print to be decorated on the wall of the room from among the images in the group registered in advance or the images in the group possessed by the user on the basis of the acquired image parameter. The selection unit can acquire the image parameter indicating the feature of the image print suitable for the image print to be decorated on the room from the third machine learning unit and select the image corresponding to an image print suitable for an image print to be decorated on the wall of the room from among the images in the group on the basis of the acquired image parameter.

In the image print proposal device according to still another aspect of the present invention, it is preferable for the selection unit to include a fourth machine learning unit caused to learn acquisition of an image corresponding to the image print suitable for the image parameter on the basis of the image group for a teacher and the image parameter group for learning indicating a feature of the image group for the teacher, and it is preferable for the fourth machine learning unit to select an image corresponding to an image print suitable for an image print to be decorated on the wall of the room from among the images in the group registered in advance or the images in the group possessed by the user on the basis of the acquired image parameter. The fourth machine learning unit can select the image corresponding to an image print suitable for an image print to be decorated on the wall of the room from among the images in the group on the basis of the acquired image parameter.

In the image print proposal device according to still another aspect of the present invention, it is preferable for the selection unit to include a fifth machine learning unit caused to learn acquisition of the image corresponding to the image print suitable for the image print to be decorated on the wall of the room on the basis of an image group of the room for learning and the image group for a teacher, and it is preferable for the fifth machine learning unit to select an image corresponding to the image print suitable for an image print to be decorated on the room from among the images in the group registered in advance or the images in the group possessed by the user on the basis of the acquired image of the room. According to this, the fifth machine learning unit can select the image corresponding to the image print suitable for an image print to be decorated on the room from among the images on the basis of the acquired image of the room.

In the image print proposal device according to still another aspect of the present invention, it is preferable for the selection unit to select a plurality of images corresponding to a plurality of higher-ranked image prints with a higher degree of fitness among image prints suitable for image prints to be decorated in the room from among the images in the group registered in advance or the images in the group possessed by the user, and for the proposal unit to propose the plurality of selected images to the user. Accordingly, the user can select a desired image from among the plurality of proposed images.

In the image print proposal device according to still another aspect of the present invention, it is preferable for the proposal unit to combine the selected image with a wall region in the acquired image of the room and presents a combination image to the user. Accordingly, the user can check an atmosphere or harmony of the room in a case where the proposed image print is decorated on a wall of an actual room.

In the image print proposal device according to still another aspect of the present invention, it is preferable for the selection unit to further select a picture frame suitable for the selected image from among picture frames in the group registered in advance, and for the proposal unit to propose the selected image and the picture frame to the user.

In the image print proposal device according to still another aspect of the present invention, it is preferable for the selection unit to further select content suitable for the selected image from among contents in a group registered in advance, and for the proposal unit to propose the selected image and the content to the user. For example, it is conceivable that, in a case where an image of the sea is proposed, the selection unit selects content (for example, Hawaiian miscellaneous goods) placed together with an image print of the sea, and the proposal unit presents an image corresponding to the Hawaiian miscellaneous goods together with the image of the sea.

In the image print proposal device according to still another aspect of the present invention, it is preferable that, in a case where the selection unit selects an image corresponding to an image print suitable for an image print to be decorated in the room from among images in a group possessed by the user, the selection unit further select an image of which imaging position information is close from among the images in the group registered in advance on the basis of imaging position information of the selected image, and the proposal unit combine the selected image possessed by the user with the selected image of which the imaging position information is close, and propose a combination image to the user. Accordingly, it is possible to combine and propose an image of a user and an image of which an imaging position is close to that of the image of the user (for example, an image captured by a professional photographer).

In the image print proposal device according to still another aspect of the present invention, it is preferable for the image print proposal device to further include an order reception unit that receives an order of an image print corresponding to the image proposed by the proposal unit from the user.

An image print proposal method according to still another aspect of the present invention includes acquiring an image of a room captured by a user; selecting an image corresponding to an image print suitable for an image print to be decorated in the room from among images in a group registered in advance or images in a group possessed by the user on the basis of the acquired image of the room; and proposing the selected image to the user as an image corresponding to the image print to be decorated in the room.

In the image print proposal method according to still another aspect of the present invention, it is preferable for the selecting to include analyzing the acquired image of the room and acquiring a room parameter indicating a feature of the room; and extracting an image corresponding to an image print suitable for an image print to be decorated on a wall of the room from among the images in the group registered in advance or the images in the group possessed by the user on the basis of the acquired room parameter.

In the image print proposal method according to still another aspect of the present invention, it is preferable for the proposing to include combining the selected image with a wall region in the acquired image of the room and presenting a combination image to the user.

An image print proposal program according to still another aspect of the present invention causes a computer to execute functions of: acquiring an image of a room captured by a user; selecting an image corresponding to an image print suitable for an image print to be decorated in the room from among images in a group registered in advance or images in a group possessed by the user on the basis of the acquired image of the room; and proposing the selected image to the user as an image corresponding to the image print to be decorated in the room.

In the image print proposal program according to still another aspect of the present invention, it is preferable for the selecting function to include functions of: analyzing the acquired image of the room and acquiring a room parameter indicating a feature of the room; and extracting an image corresponding to an image print suitable for an image print to be decorated on a wall of the room from among the images in the group registered in advance or the images in the group possessed by the user on the basis of the acquired room parameter.

In the image print proposal program according to still another aspect of the present invention, it is preferable for the proposing function to include combining the selected image with a wall region in the acquired image of the room and presenting a combination image to the user.

According to the present invention, it is possible to propose an image print suitable to be decorated on the wall of the room of the user to the user.

DESCRIPTION OF THE PREFERRED EMBODIMENTS

Hereinafter, preferred embodiments of an image print proposal device, method and program according to the present invention will be described with reference to the accompanying drawings.

[First Embodiment of Image Print Proposal Device]

Figure 1:
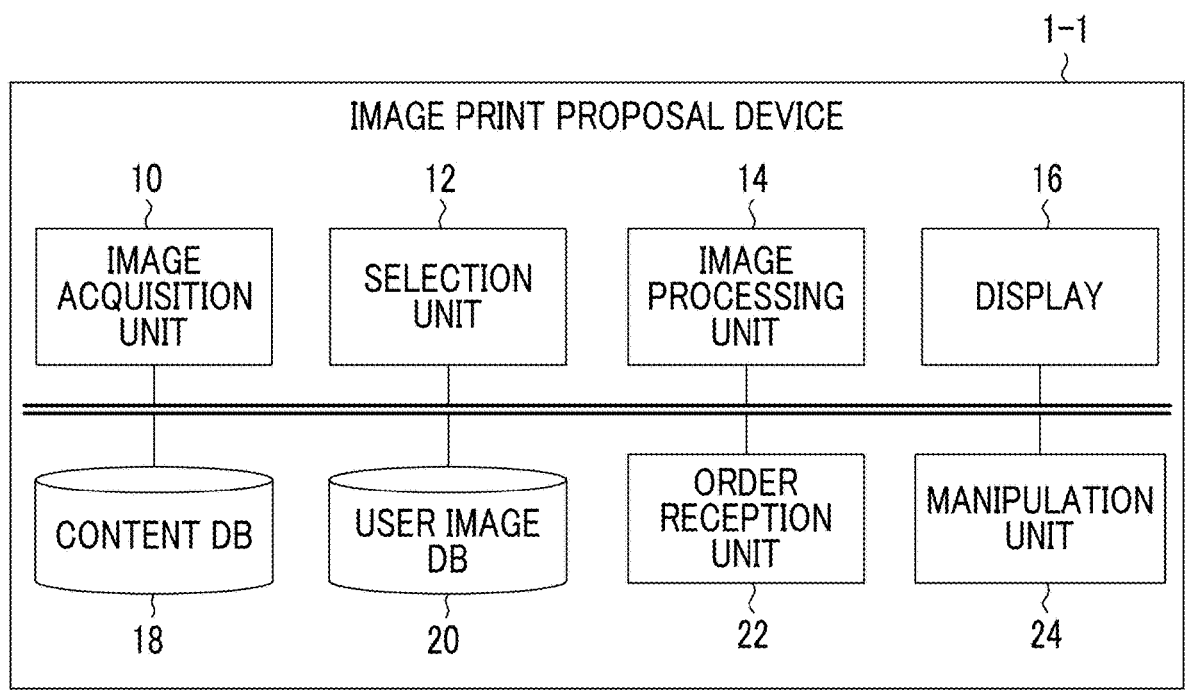
FIG. 1 is a block diagram illustrating a first embodiment of an image print proposal device according to the present invention.

FIG. 1 is a block diagram illustrating a first embodiment of an image print proposal device according to the first invention.

An image print proposal device 1-1 illustrated in FIG. 1 is installed in, for example, a shop that receives an order for image print and is appropriately manipulated by a user. The image print proposal device 1-1 mainly includes an image acquisition unit 10, a selection unit 12, an image processing unit 14, a display 16, a content database (DB) 18, a user image database 20, an order reception unit 22, and a manipulation unit 24.

A hardware structure executing various controls of the image print proposal device 1-1 is various processors of a computer as follows. Various processors include, for example, a central processing unit (CPU) that is a general-purpose processor that execute software (including programs (including an image print proposal program)) and functions various control units, a programmable logic device (PLD) that is a processor of which a circuit configuration can be changed after manufacture, such as a field programmable gate array (FPGA), and a dedicated electric circuit that is a processor having a circuit configuration designed to be dedicated to execution of a specific process, such as an application specific integrated circuit (ASIC).

One processing unit may be configured of one of the various processors or may be configured of the same type or different types of two or more of processors (for example, a plurality of FPGAs or a combination of a CPU and an FPGA). Further, a plurality of control units may be configured of one processor. A first example in which the plurality of control units is configured of one processor is a form in which one processor is configured of a combination of one or more CPUs and software to be represented by a computer such as a client or a server, and this processor functions as the plurality of control units. A second example is a form in which a processor realizing a function of an entire system including the plurality of control units using one integrated circuit (IC) chip to be represented by a system-on-chip (SoC) or the like is used. Thus, various control units have a hardware structure and are configured of one or more of processors.

The image acquisition unit 10 is a unit that is connected to a user terminal with a camera (for example, a smartphone) or a recording medium such as a universal serial bus (USB) memory, or a memory card (for example, an SD card) used for a digital camera via a communication interface and acquires an image of a room (hereinafter referred to as a "room image") imaged by a user from the user terminal or the recording medium.

Figure 2:
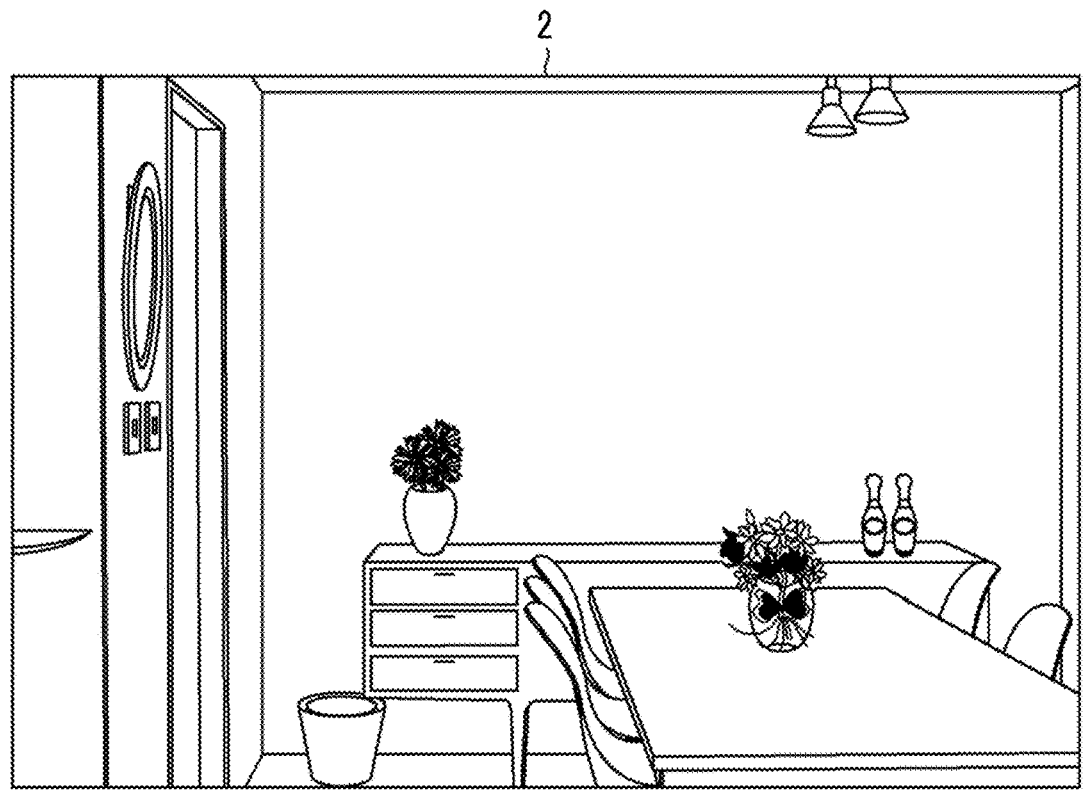
FIG. 2 is a diagram illustrating an example of a room image acquired by an image acquisition unit.

FIG. 2 is a diagram illustrating an example of a room image 2 acquired by the image acquisition unit 10. Further, the room image may be a still image or may be a moving image obtained by imaging a room to be decorated with an image print. In a case where the room image is a moving image, the moving image is divided into a plurality of still images which do not overlap each other (or less overlap each other) using a known means in a subsequent process. A room image of the plurality of still images may be treated as being input.

A user using the image print proposal device 1-1 images his or her room (a room decorated with the image print) using a smartphone or the like, and inputs a captured room image to the image print proposal device 1-1 via the image acquisition unit 10.

In the content DB 18, a large number of images (a group of images) for image print decorated on the wall of the room are registered in advance. The group of images registered herein is, for example, a group of images captured by a professional photographer.

In the user image DB 20, a group of images captured by each user and possessed by the user is registered and managed for each user. Further, a group of images possessed by the user can be registered in the user image DB 20 from the user terminal or the recording medium via the image acquisition unit 10.

The content DB 18 and the user image DB 20 are not limited to those embedded into the image print proposal device 1-1, and may be connected by a local area network (LAN) or the like and accessed appropriately.

The selection unit 12 functions as an image selection unit that selects an image corresponding to an image print suitable for the image print to be decorated in a room from among the images in the group registered in the content DB 18 or the group of images registered in the user image DB 20 on the basis of the room image acquired by the image acquisition unit 10.

The image processing unit 14 and the display 16 function as a proposal unit that proposes the image selected by the selection unit 12 to the user as an image corresponding to the image print to be decorated in the room.

The image processing unit 14 is a unit that processes the image selected by the selection unit 12, and functions as a display control unit that generates an image to be displayed on the display 16 (an image for a display) from the selected image. In addition, the image processing unit 14 has a function of combining the selected image with a wall region within the room image acquired by the image acquisition unit 10 and generating a combination image (a combination image) as the image for a display, and a function of performing image processing for image print (a process of adjusting brightness or color tone) on the selected image.

The display 16 includes a liquid crystal display, an organic electroluminescence display, or the like. The display 16 receives the image for a display and displays an image for an image print and other information on a display screen.

The order reception unit 22 is a unit that receives an order of image print on the basis of a user manipulation in the manipulation unit 24. In a case where the user sees and likes the image for an image print displayed on the display 16, the user can purchase the image print proposed as an image print to be decorated on a wall of a room of the user. Moreover, a proposer can promote sales of the image prints.

The manipulation unit 24 includes a mouse, a pointing device including, for example, a touch panel in a case where the display 16 includes the touch panel, and a keyboard. The manipulation unit 24 functions as an input unit that enables the user to manipulate a pointer or an icon in an on-screen interactive manner while viewing a screen of the display 16 or input order information or other information to the order reception unit 22.

Figure 3:
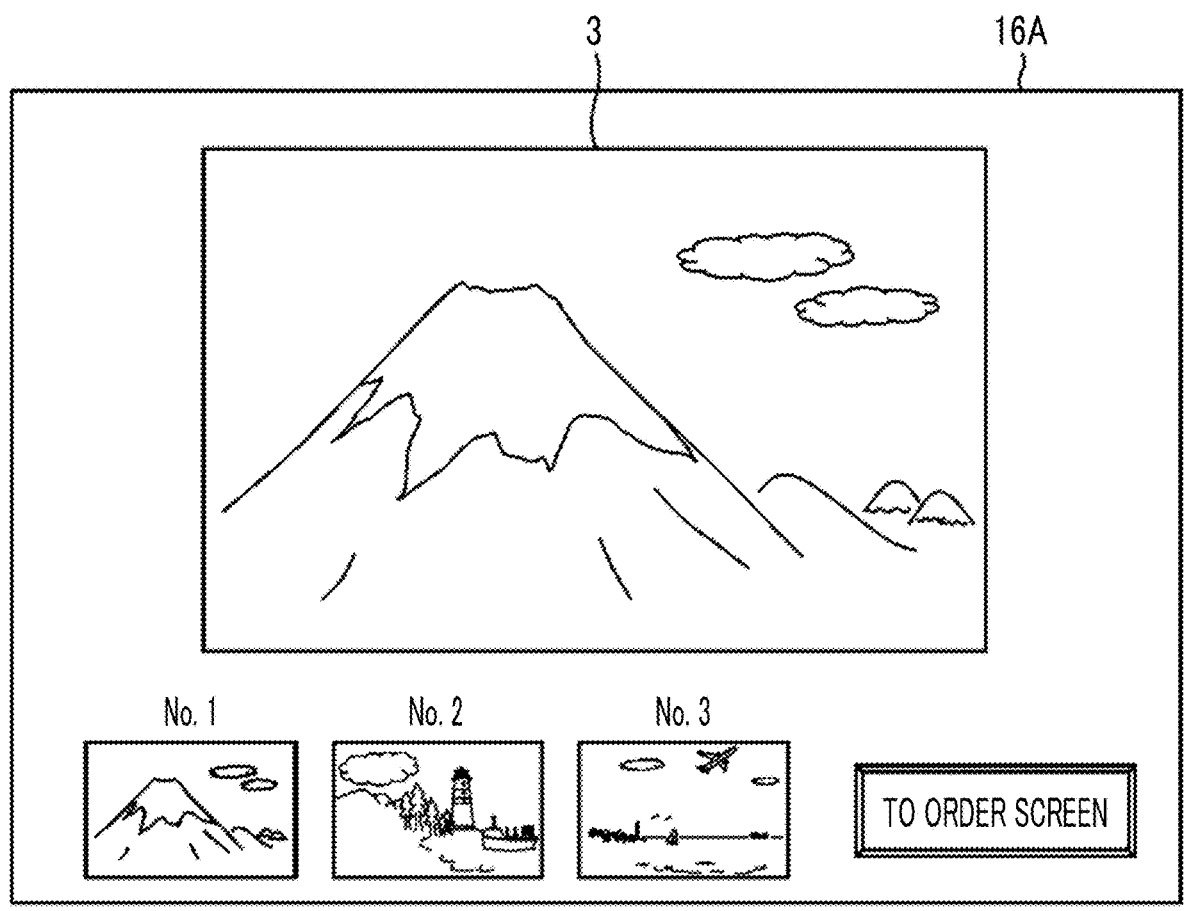
FIG. 3 is a diagram illustrating an example of a display screen of a display.

FIG. 3 is a diagram illustrating an example of a display screen 16A of the display 16.

An image 3 selected from among the images in the group registered in the content DB 18 and the user image DB 20 by the selection unit 12, which is an image 3 corresponding to an image print suitable for an image print to be decorated in the room, on the basis of the room image, is displayed on the display screen 16A of the display 16 illustrated in FIG. 3, thereby proposing an image print to be decorated in the room of the user to the user.

The selection unit 12 can select a plurality of images corresponding to a plurality of higher-ranked image prints with a higher degree of fitness among image prints suitable for image prints to be decorated in the room from among the images in the group. The display 16 functioning as a proposal unit can display a plurality of images.

In the example illustrated in FIG. 3, three thumbnail images (No. 1, No. 2, and No. 3) corresponding to three higher-ranked image prints with higher degree of fitness, and an image 3 which is a main image corresponding to the thumbnail image No. 1 are displayed on the display screen 16A of the display 16. In a case where a user desires to confirm details of an image other than the image 3, the user can designate the thumbnail image No. 2 or No. 3 using a pointing device to cause a main image corresponding to the thumbnail image to be displayed instead of the image 3.

Further, an icon "To order screen" is displayed on the display screen 16A of the display 16. By clicking on this icon, the user makes a transition to a screen for ordering a photograph print corresponding to the image enlarged and displayed on the display screen 16A.

Accordingly, the image print proposal device 1-1 can propose, to the user, an image print suitable to be decorated on the wall of the room of the user, and the user can easily select an image print suitable for a room decorated with the image print.

In the example illustrated in FIG. 3, the user can select a desired image from among three images corresponding to the three higher-ranked image prints with the high degree of fitness, but the number of images to be presented is not limited. In addition, only an image with the highest degree of fitness may be proposed. In this case, it is preferable for proposal of another image (for example, an image with the next highest degree of fitness or an image in a category different from the proposed image) to be requested according to a manipulation of the manipulation unit 24 of the user in order to be able to deal with a case where the user does not like the proposed image.

<Selection Unit of First Embodiment>

Figure 4:
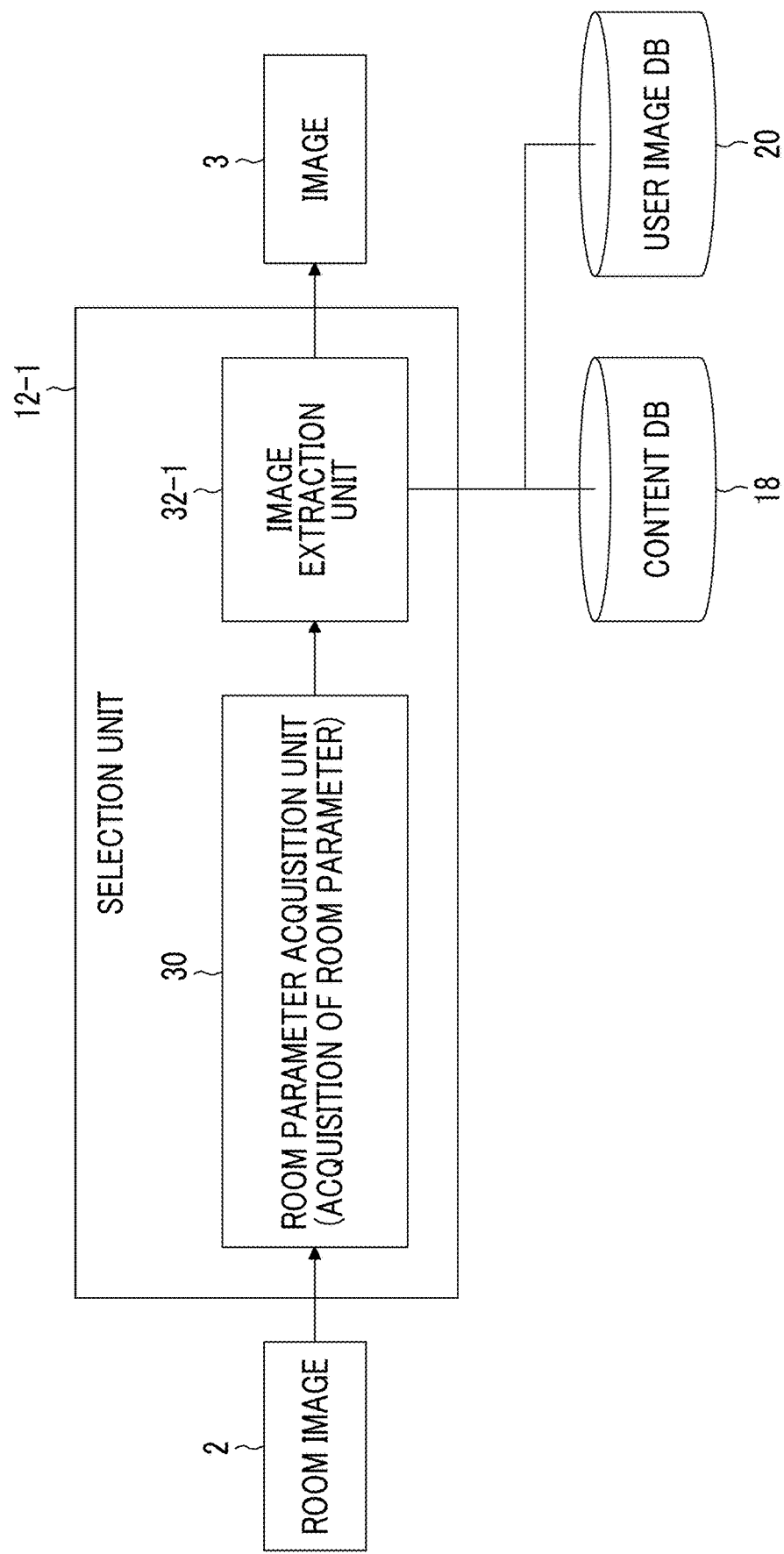
FIG. 4 is a block diagram of a selection unit mainly illustrating a first embodiment of a selection unit illustrated in FIG. 1.

FIG. 4 is a block diagram of a selection unit 12-1 mainly illustrating a first embodiment of the selection unit 12 illustrated in FIG. 1.

The selection unit 12-1 of the first embodiment illustrated in FIG. 4 includes a room parameter acquisition unit 30, and an image extraction unit 32-1 of the first embodiment.

The room parameter acquisition unit 30 analyzes the room image 2 acquired by the image acquisition unit 10 and acquires a room parameter indicating a feature of the room that can be ascertained from the room image 2. The room parameter includes a type of room (living, dining, bedroom, study, entrance, or the like), a size ($cm^2$) of the room (a wall), an orientation of the room (the wall), a shape (rectangle, square, or the like) of the room, color of the room, and brightness (lux) of the room, and the like.

The type of room can be estimated, for example, by extracting objects in the room image. In a case where there is a TV or a sofa in the room, the room can be estimated to be a living room. In a case where there is a dining table or a cupboard in the room, the room can be estimated to be a dining room. In a case where there is a bed in the room, the room can be estimated to be a bedroom.

The size of the room (the wall) can be estimated on the basis of a size of a door in the room, a size of a chair, and the like. The orientation of the wall (an orientation of a wall surface) can be acquired from header information of an image file in which the room image is recorded.

For example, in a case where the room image is captured by a smartphone having a compass function, orientation information indicating an orientation at the time of imaging is recorded in a header of an image file as incidental information of the image. Therefore, by reading the orientation information recorded in the header of the image file, it is possible to know the orientation of the wall (an orientation to which the wall is directed). For example, in a case where the room image is captured while facing the wall and orientation information indicating north is recorded as incidental information of the room image, a surface face of the wall is directed to the south. In addition, in a case where a shadow of an object is reflected in the room image due to the sun, the orientation of the wall surface can be detected from a direction of the shadow and an imaging time.

The brightness of the room can be obtained from brightness of the room image and imaging conditions (a shutter speed and an F-number recorded as the incidental information in the header).

On the basis of the room parameter acquired by the room parameter acquisition unit 30, the image extraction unit 32-1 extracts the image 3 corresponding to the image print suitable for the image print to be decorated on the wall of the room from the images in the group registered in the content DB 18 or the user image DB 20. According to this, it is possible to extract an image harmonized with, for example, an atmosphere of the room Next, a case where acquisition of the above room parameter is performed using artificial intelligence (AI) will be described.

A machine learning device is known as a scheme for realizing artificial intelligence. In recent years, a convolutional neural network (CNN) that calculates feature quantities from images through learning and performs an image recognition process has attracted attention as the machine learning device.

Figure 5:
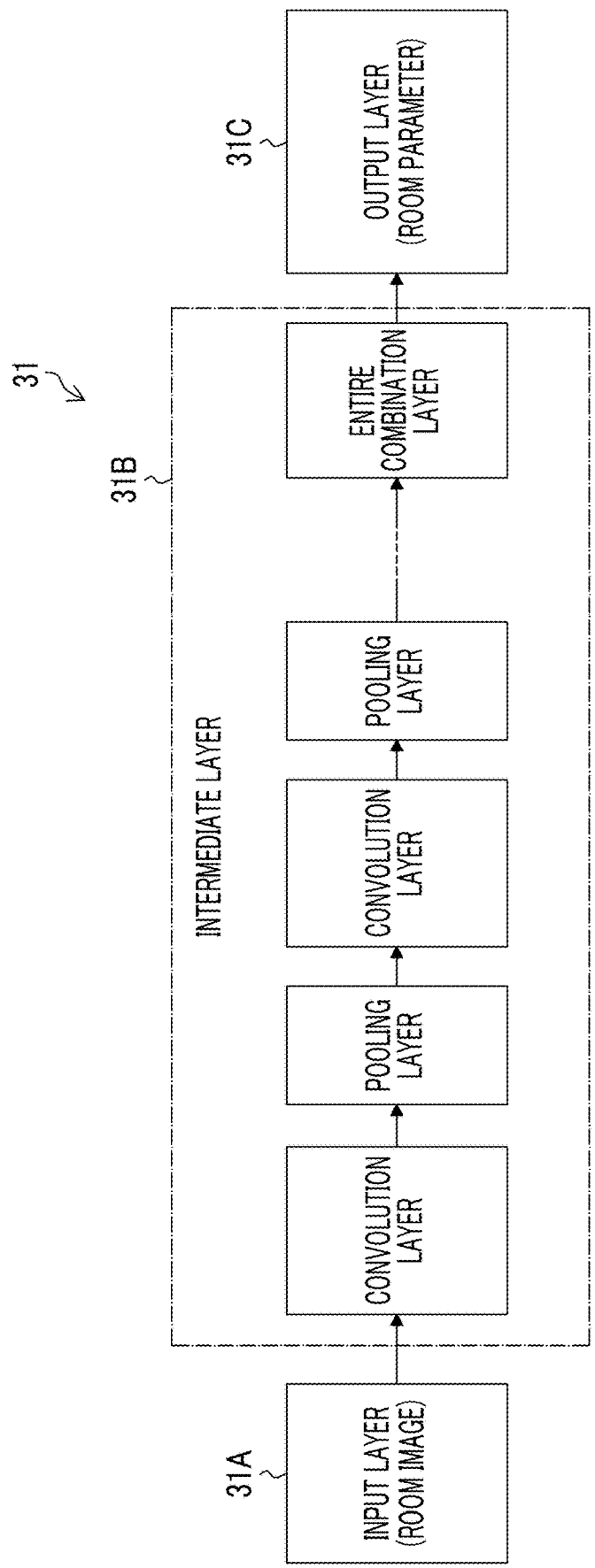
FIG. 5 is a schematic diagram illustrating a representative configuration example of a CNN that is applied to a room parameter acquisition unit.

FIG. 5 is a schematic diagram illustrating a representative configuration example of the CNN that is applied to the room parameter acquisition unit 30.

As illustrated in FIG. 5, a first machine learning unit 31 configured as the room parameter acquisition unit includes an input layer 31A, an intermediate layer (a hidden layer) 31B including a plurality of sets and an entire combination layer, and an output layer 31C. The plurality of sets includes convolution layers and pooling layers. Each layer has a structure in which a plurality of "nodes" is connected by "edges".

A room image that is a recognition process target is input to the input layer 31A.

An intermediate layer 31B includes a plurality of sets each including a convolution layer and a pooling layer, and an entire combination layer, and extracts features from the image input from the input layer 31A. The convolution layer performs a filtering process on a nearby node in a previous layer (performs a convolution calculation using a filter) to acquire a "feature map". The pooling layer reduces the feature map output from the convolution layer to obtain a new feature map. The "convolution layer" serves to perform feature extraction such as edge extraction from an image, and "pooling layer" serves to give robustness so that the extracted feature is not influenced by parallel movement or the like.

The intermediate layer 31B is not limited to a case where the convolution layer and the pooling layer are formed as one set, but a case where the convolution layer is continuous or a normalization layer is also included. In addition, a "weight" and a "bias" of a filter to be used in each convolution layer are learned automatically using a large number of pieces of learning data in advance.

The first machine learning unit 31 configured as the room parameter acquisition unit of the example is a unit caused to learn acquisition of the room parameters on the basis of the image group of the room for learning and the room parameter group for a teacher indicating the features of the images group of the room. In a case where the room image is input to the input layer 31A, room parameters indicating the features of the room indicated by the room image are output from the output layer 31C through the process in the intermediate layer 31B. According to this, it is possible to acquire the room parameter indicating the feature of the room easily and accurately The first machine learning unit is not limited to a case where all of a plurality of room parameters are acquired, but a case where some of the plurality of room parameters are acquired is included.

<Selection Unit of Second Embodiment>

Figure 6:
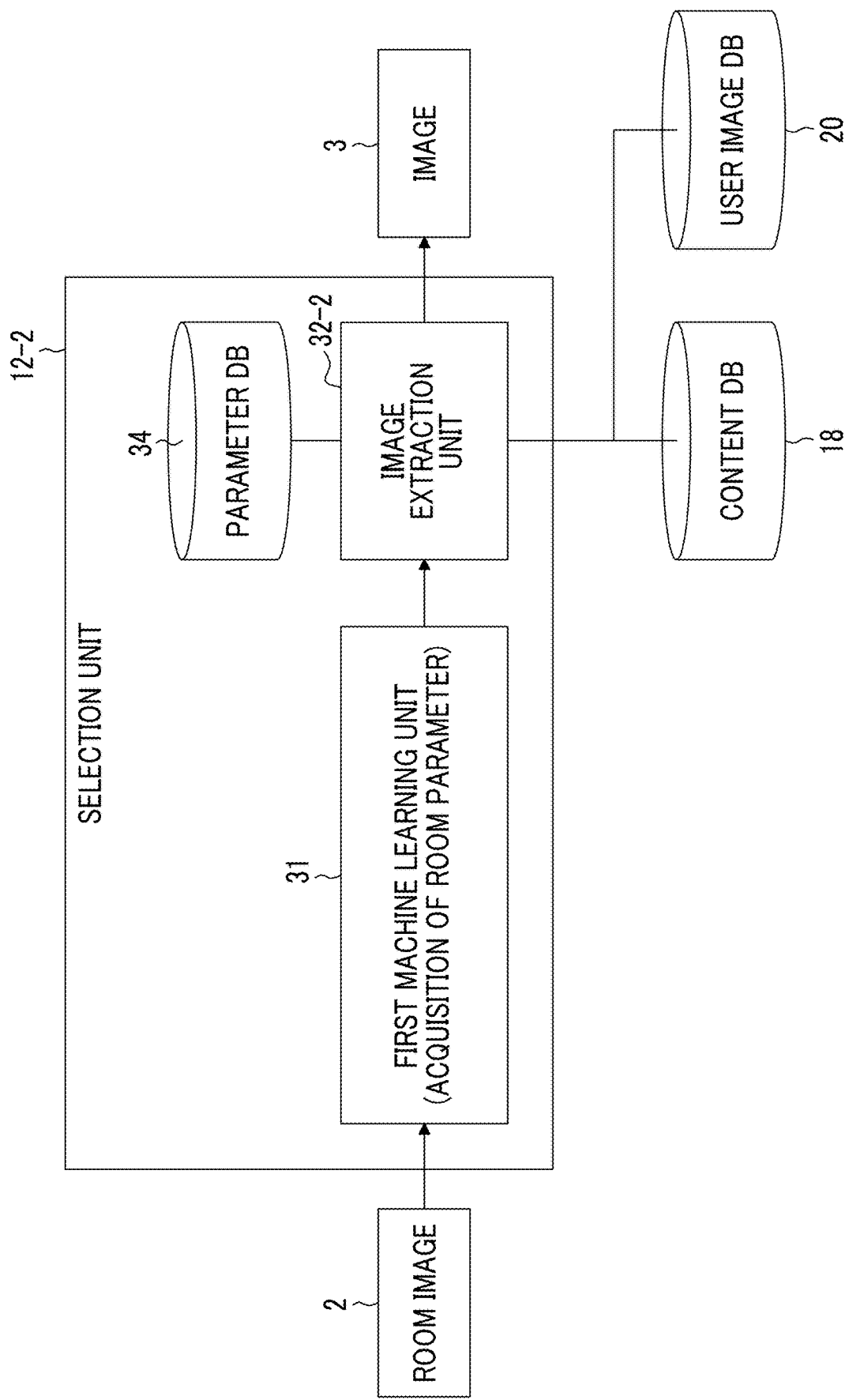
FIG. 6 is a block diagram of the selection unit mainly illustrating a second embodiment of the selection unit illustrated in FIG. 1.

FIG. 6 is a block diagram of a selection unit 12-2 mainly illustrating a second embodiment of the selection unit 12 illustrated in FIG. 1. In FIG. 6, units that are the same as those in the selection unit 12-1 illustrating the first embodiment illustrated in FIG. 4 are denoted by the same reference numerals, and detailed description thereof will be omitted.

The selection unit 12-2 of the second embodiment illustrated in FIG. 6 includes a first machine learning unit 31, an image extraction unit 32-2 of the second embodiment, and a parameter DB 34.

The first machine learning unit 31 is configured as a room parameter acquisition unit as described with reference to FIG. 5. In a case where the room image 2 is input, the first machine learning unit 31 calculates a room parameter corresponding to the input room image 2, and outputs the room parameter to the image extraction unit 32-2.

The parameter DB 34 functions a storage unit defining (stores) a relationship between the room parameter indicating the feature of the room and the image parameter indicating the feature of the image print suitable for an image print to be decorated on the wall of the room.

Here, as the image parameter, an image size, number of frames, a frame design, a type of content, a type of user image, and the like are conceivable, in addition to various feature quantities obtained by analyzing an image (a room image). The feature quantities of the room image correspond to feature quantities obtained by obtaining, as a feature, an arrangement rule of basic elements constituting a texture of the room image, feature quantities obtained by obtaining, as a feature, a statistical quantity indicating nature of the image such as uniformity of a density of pixels of the room image or a change in contrast from the density, or the like.

Further, an association between the room parameter indicating the feature of the room and the image parameter indicating the feature of the image print can be performed, for example, by associating the room image with an image print suitable for decoration of the wall of the room indicated by the room image (an image print selected by a designer or the like).

On the basis of the room parameter input from the first machine learning unit 31, the image extraction unit 32-2 first acquires the image parameter corresponding to the room parameter from the parameter DB 34. In a case where the same room parameter as the acquired room parameter is not stored in the parameter DB 34, the image extraction unit 32-2 extracts a room parameter most approximate to the acquired room parameter from among the room parameters registered in the parameter DB 34, and acquires the image parameter registered in association with the room parameter from the parameter DB 34.

Subsequently, on the basis of the image parameter acquired from the parameter DB 34, the image extraction unit 32-2 extracts the image 3 corresponding to an image print suitable for the image print to be decorated on the wall of the room from among the images in the group registered in the content DB 18 or the user image DB 20. In this case, the image extraction unit 32-2 compares the acquired image parameter with an individual image parameter of the images in the group registered in the content DB 18 or the user image DB 20. In a case where an image having the matching image parameter is registered, the image extraction unit 32-2 extracts the image, and in a case where the image having the matching image parameter is not registered, the image extraction unit 32-2 extracts an image having the most approximate image parameter. It is preferable for the image parameter of the registered image to be registered in association with the image in the content DB 18 or the user image DB 20.

<Selection Unit of Third Embodiment>

Figure 7:
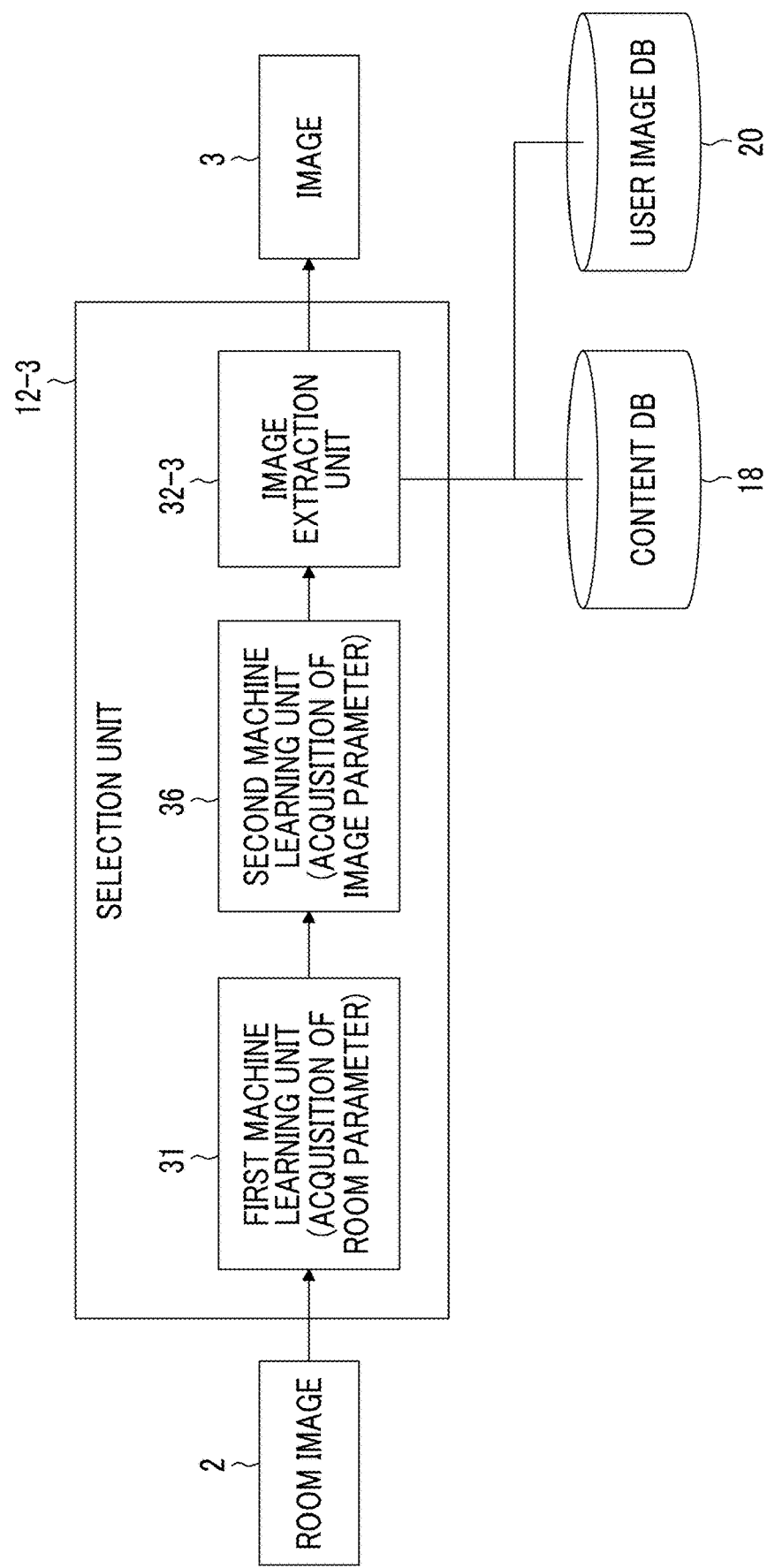
FIG. 7 is a block diagram of the selection unit mainly illustrating a third embodiment of the selection unit illustrated in FIG. 1.

FIG. 7 is a block diagram of a selection unit 12-3 mainly illustrating a third embodiment of the selection unit 12 illustrated in FIG. 1. In FIG. 7, units that are the same as those in the selection unit 12-2 illustrating the second embodiment illustrated in FIG. 6 are denoted by the same reference numerals, and detailed description thereof will be omitted.

The selection unit 12-3 of the third embodiment illustrated in FIG. 7 is different from the selection unit 12-2 of the second embodiment illustrated in FIG. 6 mainly in that the selection unit 12-3 includes a second machine learning unit 36 in place of the parameter DB 34.

The second machine learning unit 36 is a unit caused to learn acquisition of the image parameter indicating the feature of the image print suitable for an image print to be decorated on the wall of the room on the basis of the room parameter group for learning indicating the feature of the room and the image parameter group for a teacher indicating the feature of the image print group. The second machine learning unit 36 can be configured similarly to the CNN model illustrated in FIG. 5 although learning data (the room parameter group for learning) and teacher data (the image parameter group for a teacher) are different.

In a case where the room parameter acquired by the first machine learning unit 31 is received, the second machine learning unit 36 that has completed the learning calculates an image parameter corresponding to the input room parameter and outputs the calculated image parameter to the image extraction unit 32-3.

On the basis of the image parameter acquired from the second machine learning unit 36, the image extraction unit 32-3 extracts the image 3 corresponding to the image print suitable for the image print to be decorated on the wall of the room from the images in the group registered in the content DB 18 or the user image DB 20. The image extraction unit 32-2 illustrated in FIG. 6 is different from the image extraction unit 32-3 of this example in that the image extraction unit 32-2 extracts the image from among the images in the group on the basis of the image parameter acquired from the parameter DB 34, whereas the image extraction unit 32-3 extracts the image from among the images in the group on the basis of the image parameter acquired from the second machine learning unit 36.

<Selection Unit of Fourth Embodiment>

Figure 8:
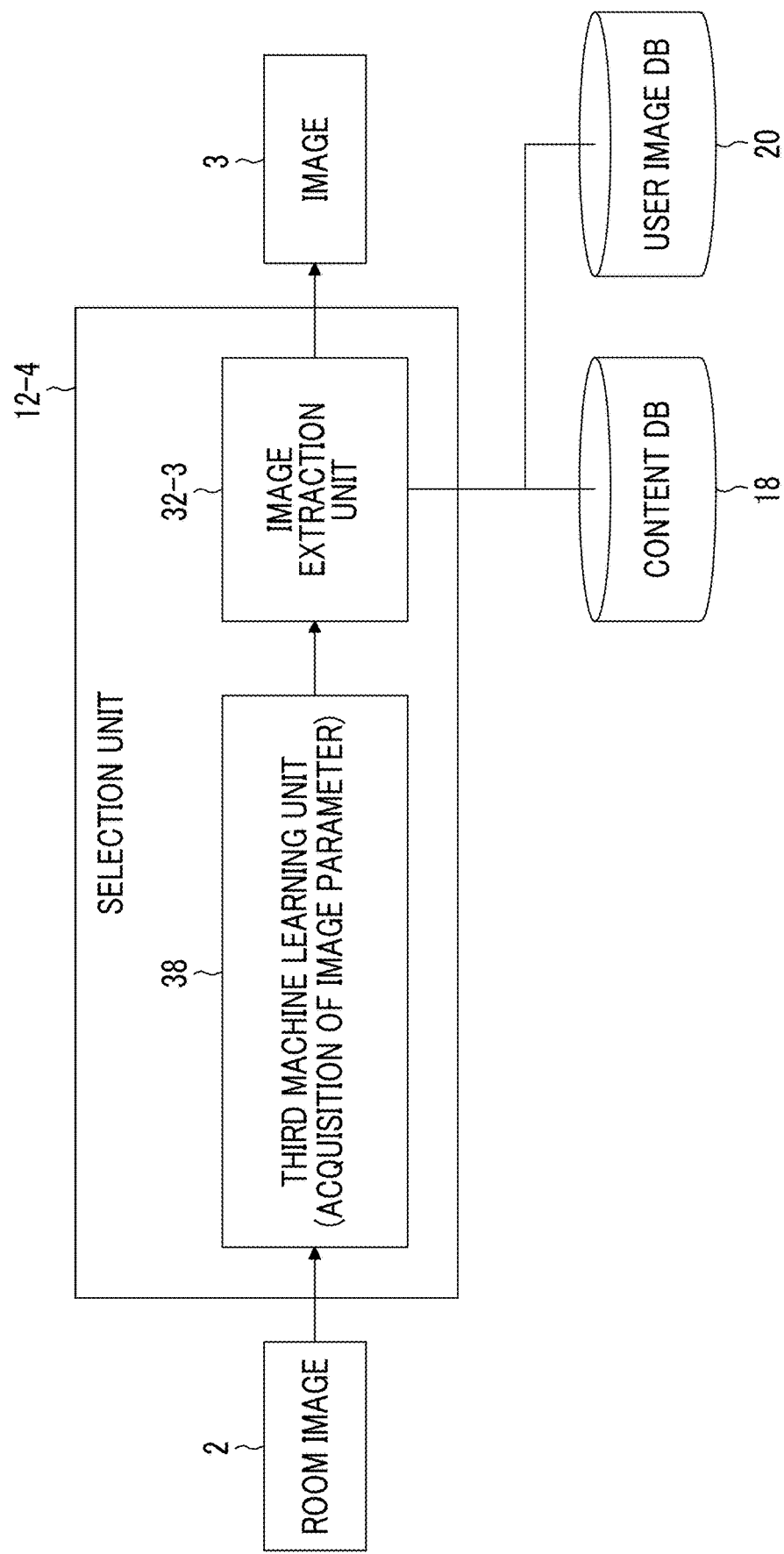
FIG. 8 is a block diagram of the selection unit mainly illustrating a fourth embodiment of the selection unit illustrated in FIG. 1.

FIG. 8 is a block diagram of a selection unit 12-4 mainly illustrating a fourth embodiment of the selection unit 12 illustrated in FIG. 1. In FIG. 8, units that are the same as those in the selection unit 12-3 illustrating the third embodiment illustrated in FIG. 7 are denoted by the same reference numerals, and detailed description thereof will be omitted.

The selection unit 12-4 of the fourth embodiment illustrated in FIG. 8 is different from the selection unit 12-3 of the third embodiment illustrated in FIG. 7 mainly in that the selection unit 12-4 includes a third machine learning unit 38 in place the first machine learning unit 31 and the second machine learning unit 36.

That is, the third machine learning unit 38 illustrated in FIG. 8 is a unit caused to learn acquisition of the image parameter indicating the feature of the image print suitable for an image print to be decorated on the wall of the room on the basis of the image group of the room for learning and the image parameter group for a teacher indicating the feature of the image print group, and the two machine learning units including the first machine learning unit 31 and the second machine learning unit 36 illustrated in FIG. 7 are substantially integrated as one machine learning unit.

In a case where the third machine learning unit 38 receives the room image 2, the third machine learning unit 38 outputs an image parameter indicating the feature of the image print suitable for an image print to be decorated on the wall of the room indicated by the room image 2. That is, the third machine learning unit 38 can output the image parameter indicating the feature of the image print suitable for the image print to be decorated on the wall of the room indicated by the room image 2 without acquiring the room parameter on the basis of the room image 2. Further, the third machine learning unit 38 can be configured similarly to the CNN model illustrated in FIG. 5 although learning data (the image group of the room for learning) and teacher data (the image parameter group for a teacher) are different.

<Selection Unit of Fifth Embodiment>

Figure 9:
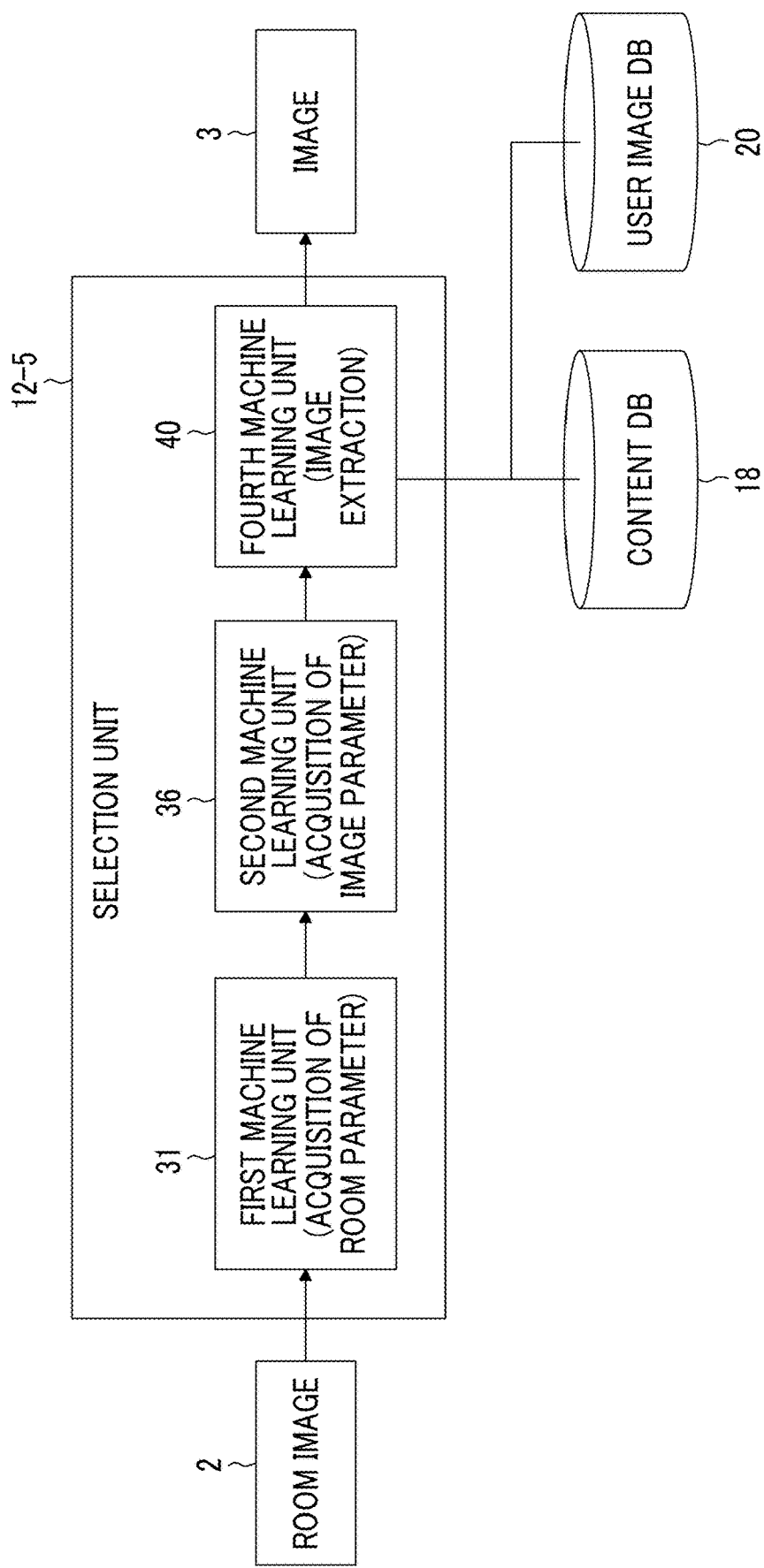
FIG. 9 is a block diagram of the selection unit mainly illustrating a fifth embodiment of the selection unit illustrated in FIG. 1.

FIG. 9 is a block diagram of a selection unit 12-5 mainly illustrating a fifth embodiment of the selection unit 12 illustrated in FIG. 1. Further, in FIG. 9, units that are the same as those in the selection unit 12-3 illustrating the third embodiment illustrated in FIG. 7 are denoted by the same reference numerals, and detailed description thereof will be omitted.

The selection unit 12-5 of the fifth embodiment illustrated in FIG. 9 is different from the selection unit 12-3 of the third embodiment illustrated in FIG. 7 mainly in that the selection unit 12-5 includes a fourth machine learning unit 40 functioning as an image extraction unit in place of the image extraction unit 32-3.

The fourth machine learning unit 40 is a unit caused to learn acquisition of an image corresponding to the image print suitable for the image parameter on the basis of the image parameter group for learning indicating a feature of the image group for a teacher and the image group for a teacher.

Therefore, in a case where the fourth machine learning unit 40 receives the image parameter from the second machine learning unit 36 (or the third machine learning unit 38 illustrated in FIG. 8), the fourth machine learning unit 40 extracts (searches for) the image 3 corresponding to the image print suitable for an image print to be decorated on the wall of the room from among the images in the group registered in the content DB 18 or the user image DB 20, and outputs the extracted image 3.

Further, the fourth machine learning unit 40 can be configured similarly to the CNN model illustrated in FIG. 5 although learning data (the image parameter group for learning) and teacher data (the image group for a teacher) are different.

<Selection Unit of Sixth Embodiment>

Figure 10:
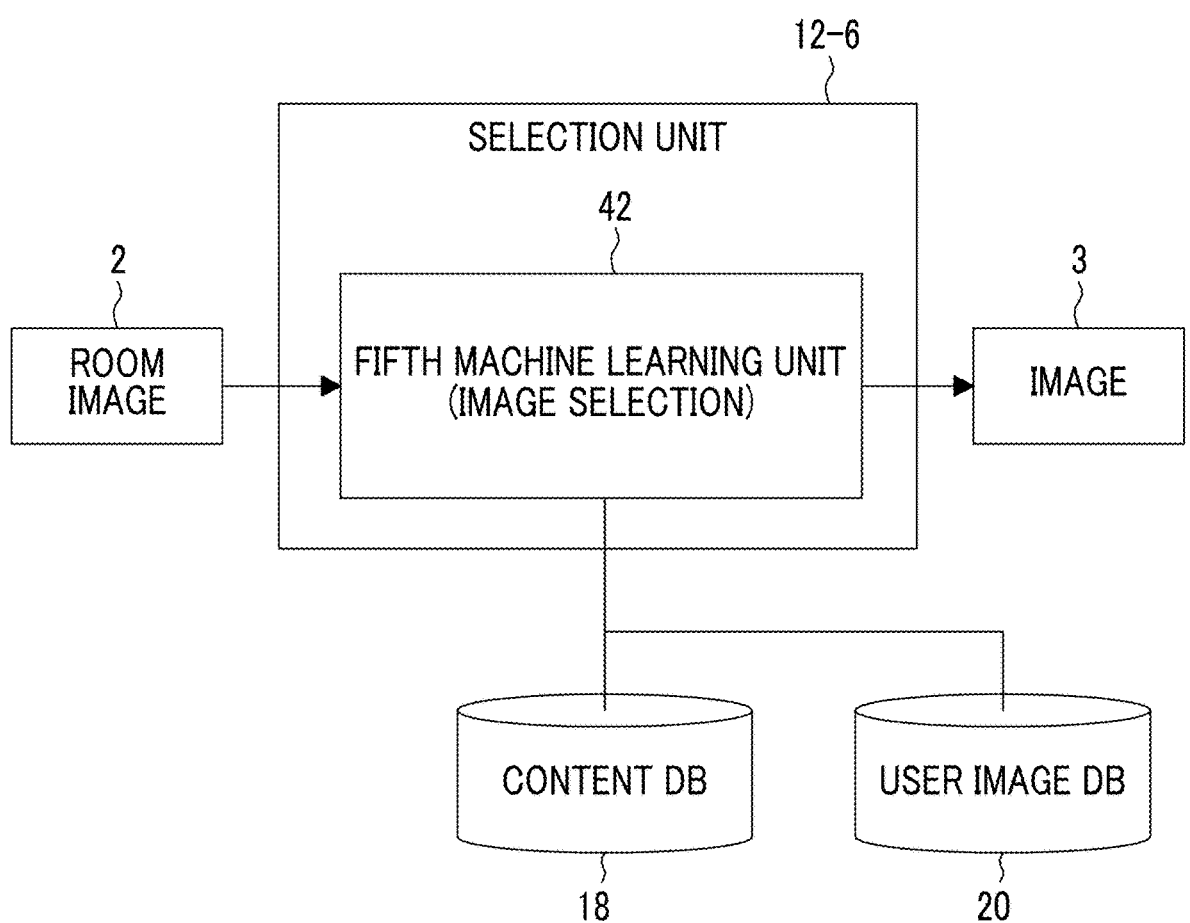
FIG. 10 is a block diagram of the selection unit mainly illustrating a sixth embodiment of the selection unit illustrated in FIG. 1.

FIG. 10 is a block diagram of a selection unit 12-6 mainly illustrating a sixth embodiment of the selection unit 12 illustrated in FIG. 1.

The selection unit 12-6 of the sixth embodiment illustrated in FIG. 10 is different from the selection unit 12-5 of the fifth embodiment illustrated in FIG. 9 in that the selection unit 12-5 of the fifth embodiment includes the first machine learning unit 31, the second machine learning unit 36, and the fourth machine learning unit 40 (three machine learning units), whereas the selection unit 12-6 of the sixth embodiment includes one fifth machine learning unit 42.

The fifth machine learning unit 42 is caused to learn acquisition of the image corresponding to the image print suitable for the image print to be decorated on the wall of the room on the basis of an image group of the room for learning and the image group for a teacher. In a case where the room image 2 is input, the fifth machine learning unit 42 selects an image 3 corresponding to the image print suitable for an image print to be decorated on the wall of the room from among the images in the group registered in the content DB 18 or the user image DB 20, and outputs the selected image 3.

Further, the fifth machine learning unit 42 can be configured similarly to the CNN model illustrated in FIG. 5 although learning data (the image group of the room for learning) and teacher data (the image group for a teacher) are different.

Although the first machine learning unit 31, the second machine learning unit 36, the third machine learning unit 38, the fourth machine learning unit 40, and the fifth machine learning unit 42 of the second embodiment are configured of the CNN model, the present invention is not limited thereto and various machine learning units configured of a support vector machine, a tree structure model, a simple Bayes, or the like may be used or different types of machine learning units may be appropriately combined and used.

Further, although the user can select a desired image from a plurality of images corresponding to a plurality of (three) image prints in the example illustrated in FIG. 3, an image selected by the user may be used as a correct answer and machine learning may be further performed using the room image at this time and the image selected by the user as learning information.

It can be detected whether or not an image print has already been decorated in the room, and in a case where the image print has been decorated, the image print can be used as a determination material in a case where an image to be proposed is extracted.

Further, in a case where the image is selected from among the images in the group registered in the content DB 18 or the user image DB 20, it is preferable for an image analysis unit (not illustrated) to classify images into a group of images suitable for image prints and a group of images not suitable for image prints in advance and for the selection unit 12 to select an image from the images in the group suitable for image prints, so that an image not suitable for the image print (an image that is out of focus or an image with a small image size) is not selected.

<Proposal Unit>

Figure 11:
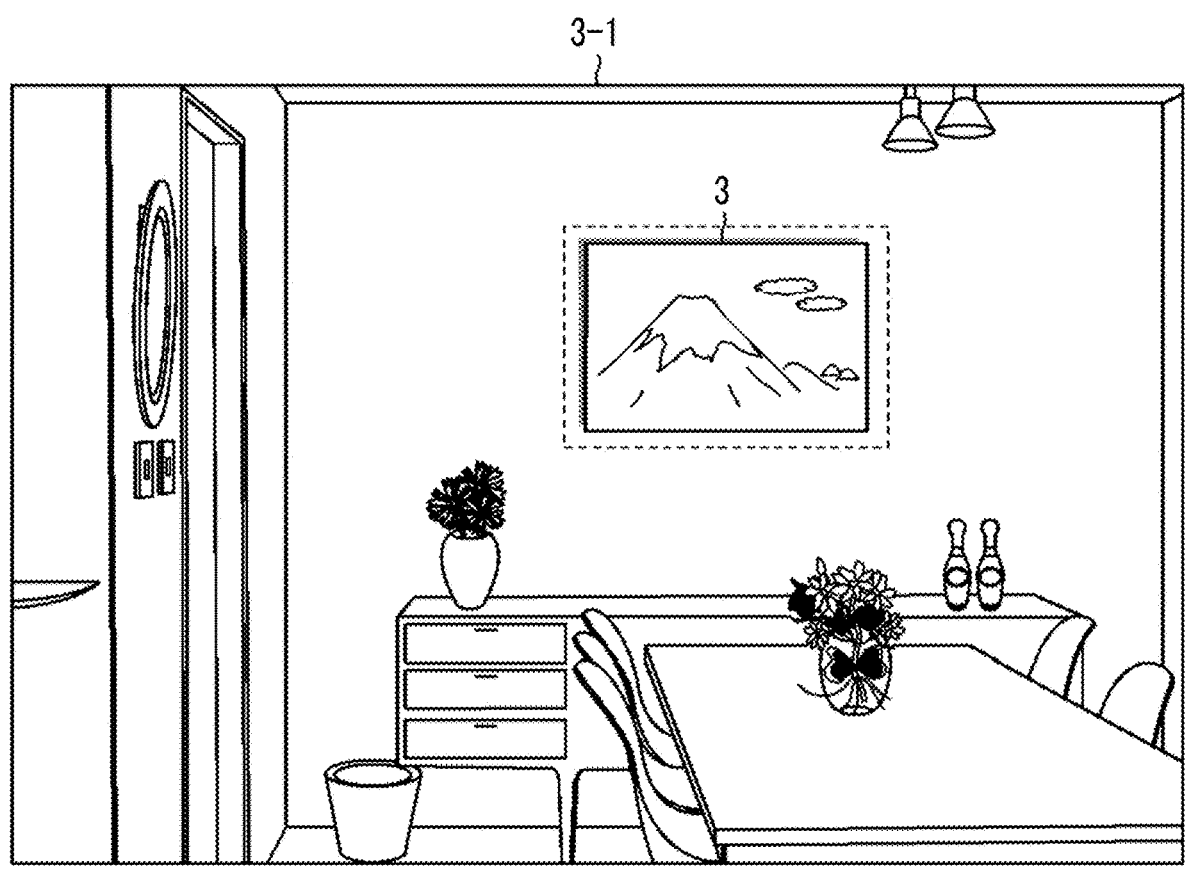
FIG. 11 is a diagram illustrating an example in which a selected image corresponding to an image print is combined with a wall region in a room image of a room of a user, and a combination image is proposed to the user.

The image processing unit 14 and the display 16 functioning as a proposal unit that proposes the image 3 selected by the selection unit 12 to the user can present an image (combination image) 3-1 obtained by combining the selected image 3 with the room image 2 (FIG. 2) as illustrated in FIG. 11, to the user.

In a case where a combination image 3-1 is presented to the user, the image processing unit 14 combines the selected image 3 with a wall region in the room image 2, and generates a combination image 3-1. In this case, the image processing unit 14 adjusts a size of the image 3 to be combined with the wall region of the room according to an area of the wall among the room parameters and a size of the image print of the selected image (A3, 8×10 inches, or the like) and combines the image 3 with the wall region. Further, in a case where imaging is not performed while facing the wall, the wall becomes in a trapezoidal shape. In this case, it is preferable for the image 3 which is combined with the room image 2 to be deformed into a trapezoidal shape. Further, such a shape of the wall can be obtained by performing image processing on the room image 2.

Further, in a case where a position of a light source, a direction of the light source, a type of the light source, and the like is detected as the room parameters, it is preferable for an effect of the light source to be applied to the image to be proposed in a case where the image to be proposed is combined with the wall region of the room image. Accordingly, it is possible to more accurately confirm an atmosphere or harmony in a case where a photograph print is placed in the actual room.

Further, the selection unit 12 may further select a picture frame from among picture frames in a group registered in the content DB 18 in advance, and the image processing unit 14 and the display 16 functioning as a proposal unit may propose the selected image and picture frame to the user.

The picture frame refers to a process of complementing an image print with a frame, a mat board, a pedestal, or the like. In the case of a picture frame using a frame or a mat board, picture frames with different type of frames or the like are different picture frames, and in the case of a picture frame of a processing method which does not use a frame or a mat board, picture frames using the frame or the mat board are different picture frames.

On the basis of the selected image, the selection unit 12 can select a picture frame suitable for the image (the image print) from among the frames in the group.

In a case where the image processing unit 14 and the display 16 functioning as a proposal unit propose the selected image and picture frame to the user, the image processing unit 14 combines an image indicating the selected picture frame with the selected image, and the display 16 displays a combination image (a framed image). Further, the framed image may be combined with the wall region in the room image 2 and a combination image may be displayed.

<Other Proposals>

The selection unit 12 further selects content from among contents in the group registered in the content DB 18 in advance, which are contents in a group other than photograph prints and picture frames. The image processing unit 14 and the display 16 functioning as a proposal unit may propose the selected image and content to the user. On the basis of the selected image, the selection unit 12 can select content suitable for the image (the image print) from among the contents in the group.

For example, it is conceivable that, in a case where an image of the sea is proposed, the selection unit 12 selects content (for example, Hawaiian miscellaneous goods) to be placed together with an image print of the sea, and the image processing unit 14 and the display 16 functioning as a proposal unit present an image corresponding to the Hawaiian miscellaneous goods together with the image of the sea.

In addition, the image processing unit 14 combines the image of the sun with the wall region in the room image 2 and combines the image corresponding to the Hawaiian miscellaneous goods with an appropriate place in the room image 2, and the display 16 may display a combination image.

Further, it is conceivable to extract positiveness of the user from a use situation of other services and reflect the positiveness in extraction conditions of the image corresponding to the image print to be decorated on the wall of the room. For example, a user ordering only a photograph print with a size L or a user entrusting selection and layout of images to be used for an album to an album creating device at the time of ordering a year album is determined to be conservative, and a user selecting a layout by himself or herself is determined is positive. It is conceivable to propose a simple and small image print to users determined to be conservative and propose a large image print or a combination of a large number of image prints to users determined to be positive.

Figure 12:
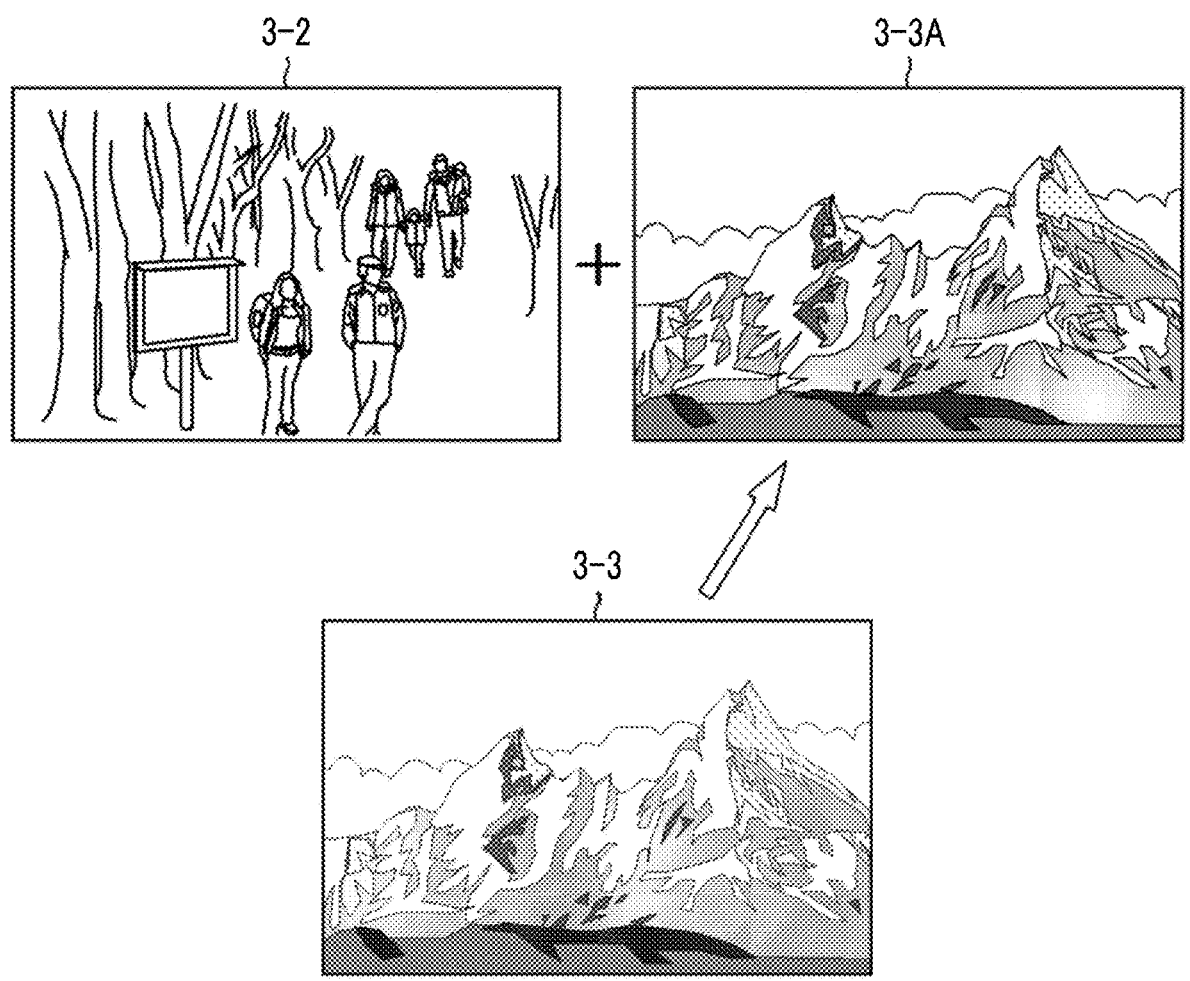
FIG. 12 is a diagram used to describe another proposal example.

Further, as illustrated in FIG. 12, the selection unit 12 may select an image (a user image) 3-2 (for example, an image in which a user is hiking at a mountain) corresponding to an image print suitable for the image print to be decorated in a room from among the images in the group possessed by the user and registered in the user image DB 20, selects an image 3-3 of which imaging position information (GPS (Global Positioning System) information) is close (an image obtained by imaging the mountain in which that the user is hiking in FIG. 12) from images in the group captured by the professional photographer registered in the content DB 18 on the basis of the imaging position information in the user image 3-2 in a case where the imaging position information is included as incidental information in the user image 3-2, combine these images, and propose a combination image.

Further, in a case where the image processing unit 14 proposes the image 3-3 captured by the professional photographer, the image processing unit 14 may adjust the image 3-3 in a direction approximate to the brightness or color tone of the user image 3-2, combine the user image 3-2 with the adjusted image 3-3A, and propose a combination image, thereby giving a sense of unity. It should be noted that the image processing unit 14 may adjust the user image 3-2 in a direction approximate to the brightness or color tone of the image 3-3 imaged by the professional photographer or may adjust both of the images.

[Second Embodiment of Image Print Proposal Device]

Figure 13:
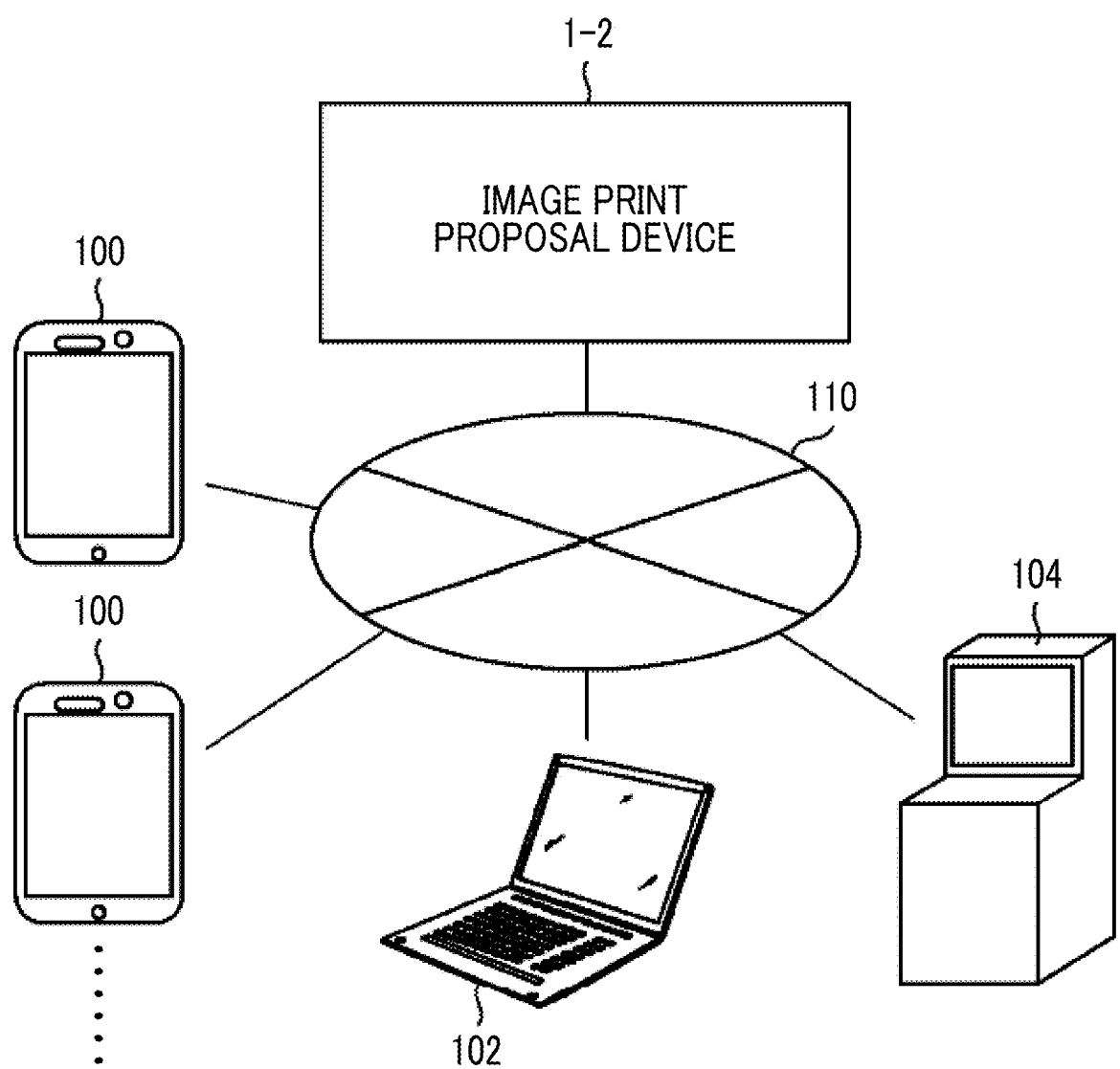
FIG. 13 is a system configuration diagram of an image print proposal system including the second embodiment of the image print proposal device according to the present invention.

FIG. 13 is a system configuration diagram of an image print proposal system including a second embodiment of the image print proposal device according to the present invention.

The image print proposal system illustrated in FIG. 13 includes an image print proposal device 1-2, a user terminal (for example, a smartphone 100 and a personal computer 102), and a store terminal 104 which are connected via a network 110 such as the Internet.

Figure 14:
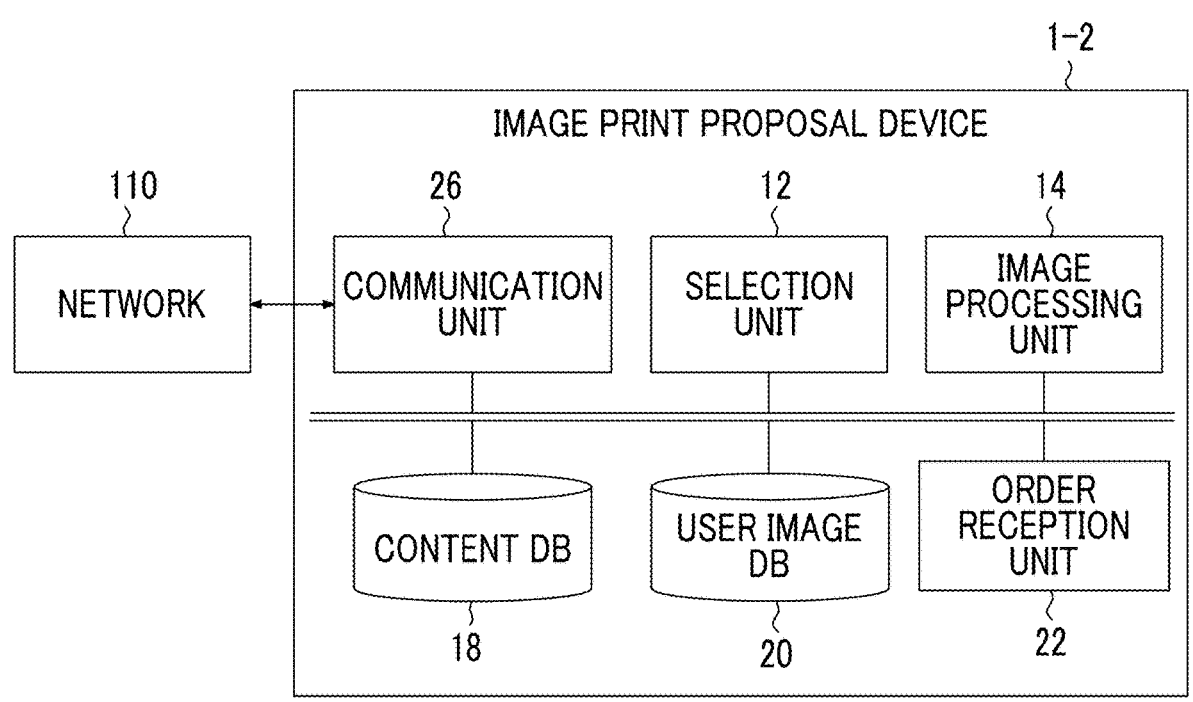
FIG. 14 is a block diagram mainly illustrating an embodiment of the image print proposal device illustrated in FIG. 13.

FIG. 14 is a block diagram mainly illustrating an embodiment of the image print proposal device 1-2 illustrated in FIG. 13.

As illustrated in FIG. 14, the image print proposal device 1-2 mainly includes a selection unit 12, an image processing unit 14, a content DB 18, a user image DB 20, an order reception unit 22, and a communication unit 26.

The image print proposal device 1-2 of the second embodiment is different from the image print proposal device 1-1 of the first embodiment illustrated in FIG. 1 in that a communication unit 26 is added and the image acquisition unit 10, the display 16, and the manipulation unit 24 are not provided.

Application software for using the image print proposal device 1-2, for example, is installed in the smartphone 100, the personal computer 102, and the store terminal 104. The smartphone 100 or the like can receive a service provided by the image print proposal device 1-2 (proposal of an image print suitable for decoration of the wall of the room) by executing this application software.

Hereinafter, a case where the user uses the smartphone 100 will be described.

The user executes an application software installed in the smartphone 100 and uploads the room image captured by the smartphone 100 to the image print proposal device 1-2 via the network 110.

The room image transmitted from the smartphone 100 is received via the communication unit 26 of the image print proposal device 1-2. Therefore, the communication unit 26 functions as an image acquisition unit that acquires the room image of the user.

The image corresponding to the image print to be decorated in the room selected by the selection unit 12 of the image print proposal device 1-2 is displayed on a display of the smartphone 100 of the user via the communication unit 26 and the network 110. Here, a function of the image print proposal device 1-2 that causes an image to be displayed on the display of the smartphone 100 corresponds to a proposal unit that proposes the image selected by the selection unit 12 to the user.

In a case where the user likes the image displayed on the display of the smartphone 100, the user can order the image print by touching an icon such as "To order screen" displayed on the display of the smartphone 100.

Further, the user can receive the provision of the service that is the same as above using the personal computer 102 or the store terminal 104. In this case, it is necessary for a room image captured by a digital camera or the like to be input to the personal computer 102 or the store terminal 104 via a recording medium of the digital camera.

[Image Print Proposal Method]

Figure 15:
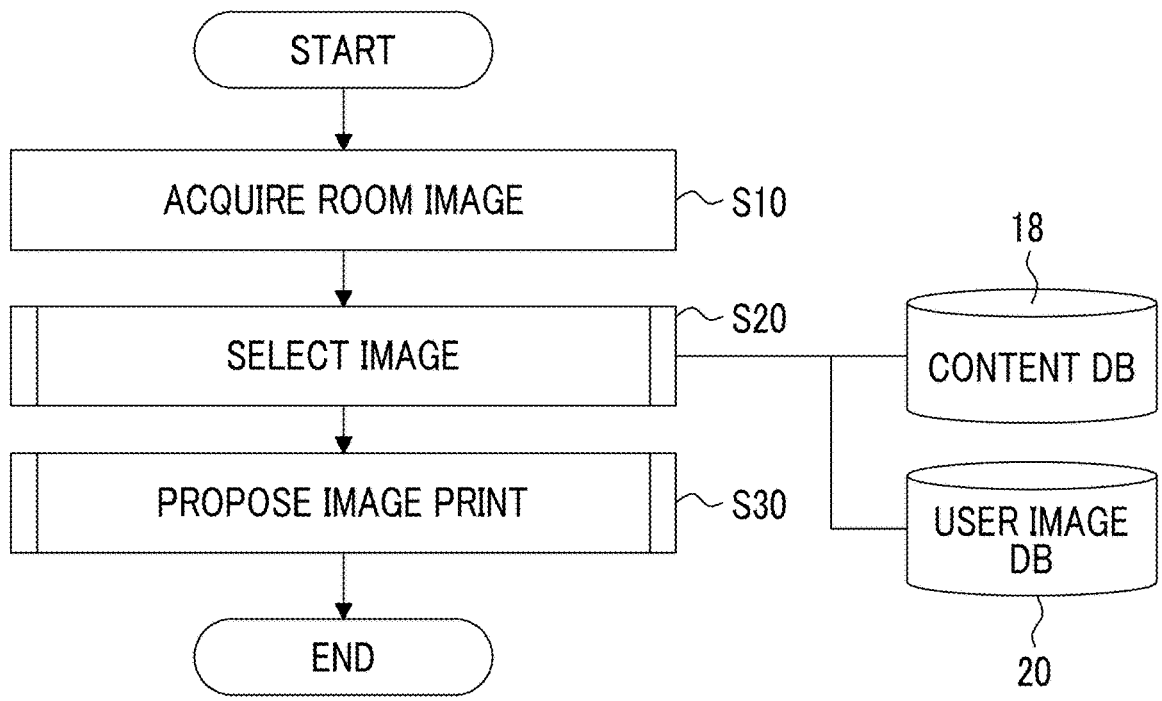
FIG. 15 is a flowchart showing an embodiment of an image print proposal method according to the present invention.

FIG. 15 is a flowchart showing an embodiment of the image print proposal method according to the present invention.

In FIG. 15, the image acquisition unit 10 of the image print proposal device 1-1 illustrated in FIG. 1 acquires a room image captured by the user (step S10).

On the basis of the room image acquired by the image acquisition unit 10, the selection unit 12 selects an image corresponding to an image print suitable for an image print to be decorated in a room indicated by the room image from among the images in the group registered in the content DB 18 and the user image DB 20 select from the group (step S20).

The display 16 functioning as a proposal unit displays the image selected by the selection unit 12 on the display screen and proposes the image to the user as an image corresponding to the image print to be decorated in the room of the user (step S30).

Accordingly, the user can easily select an image print suitable for the room to be decorated with the image print.

Figure 16:
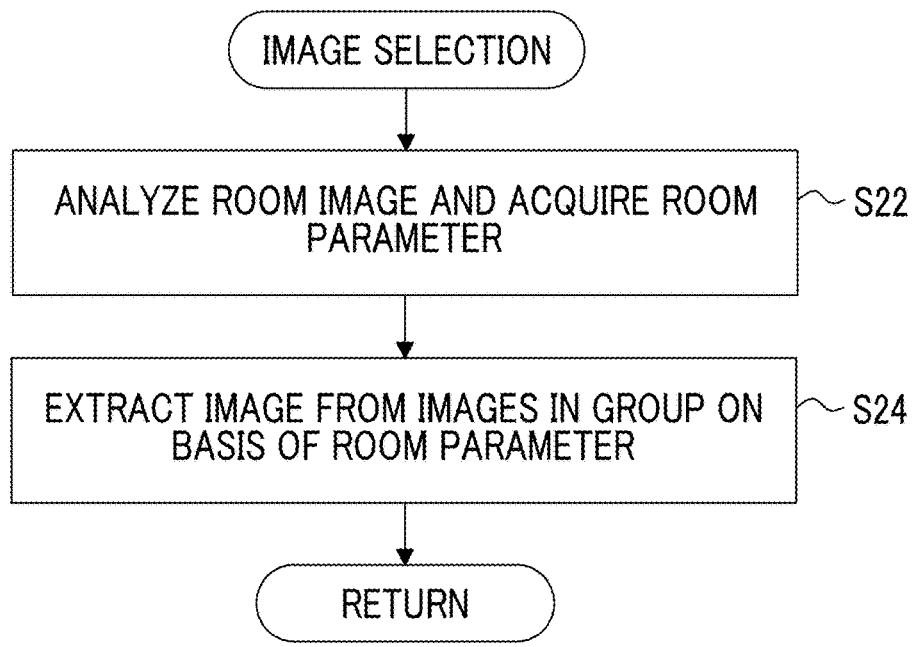
FIG. 16 is a subroutine showing an example of the process of step S20 (image selection) illustrated in FIG. 15.

FIG. 16 is a flowchart of a subroutine showing an example of the process of step S20 (image selection) illustrated in FIG. 15.

In FIG. 16, the room parameter acquisition unit 30 of the selection unit 12-1 illustrated in FIG. 4 analyzes the room image 2 and acquires a room parameter indicating a feature of the room indicated by the room image (step S22).

Subsequently, the image extraction unit 32-1 extracts an image corresponding to the image print suitable for an image print to be decorated on the wall of the room of the user from among the images in the group registered in the content DB 18 and the user image DB 20 on the basis of the acquired room parameter (step S24).

Figure 17:
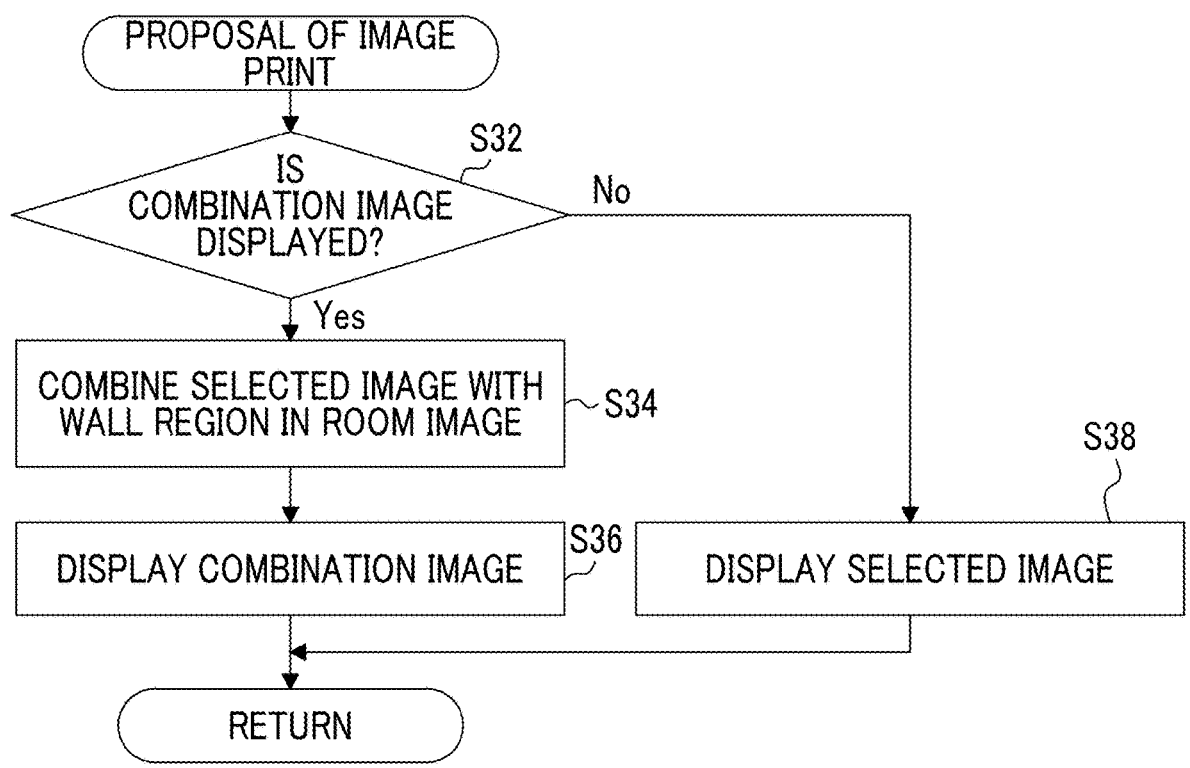
FIG. 17 is a flowchart of a subroutine showing an example of a process of step S30 (proposal of image print) illustrated in FIG. 15.

FIG. 17 is a flowchart of a subroutine showing an example of the process of step S30 (proposal of image print) illustrated in FIG. 15.

In FIG. 17, the image processing unit 14 and the display 16 functioning as a proposal unit of the selection unit 12-1 illustrated in FIG. 4 receives, via the manipulation unit 24, an instruction input from the user indicating which of a display of the combination image 3-1 illustrated in FIG. 11 and a display of a display form of the display screen 16A illustrated in FIG. 3 is to be selected (step S32).

In a case where the instruction input for a display of the combination image 3-1 is received ("Yes"), the image processing unit 14 combines the image 3 selected in step S20 with the wall region in the room image 2, generates the combination image 3-1 (step S34), and causes the generated combination image 3-1 to be displayed on the display 16 (step S36).

On the other hand, in a case where the instruction input for a display of the display form of the display screen 16A illustrated in FIG. 3 is received ("No"), the image processing unit 14 causes the image 3 selected in step S20 to be displayed on the display 16 (step S38).

The combination image 3-1 displayed in step S36 is an image suitable in a case where an atmosphere or harmony of the room in a case where the image print is decorated on the wall region of the room is confirmed, and the image 3 displayed in step S38 is suitable in a case where details of the image print decorated in the wall region of the room are confirmed since the image 3 is displayed in a large size on the display screen of the display 16.

[Others]

Although the image print proposal device selects the image corresponding to the image print suitable for the image print to be decorated in the room of the user from among the images in the group registered in advance or the images in the group owed by the user in the embodiment on the basis of the room image obtained by imaging the room of the user, the user may be able to designate whether the image print proposal device selects the image corresponding to the image print from among images in a group captured by the professional photographer or the image print proposal device selects the image corresponding to the image print from among images in the group possessed by the user. Further, the user may be able to designate a category (for example, landscape, animal, plant, or person) of the group of images to be selected.

Further, the present invention is not limited to the above-described embodiments, and it is obvious that various modifications can be performed without departing from the spirit of the present invention.

EXPLANATION OF REFERENCES

1-1, 1-2: Image print proposal device
2: Room image
3, 3-3, 3-3A: image
3-1: Combination image
3-2: User image
10: Image acquisition unit
12: Selection unit
12-1, 12-2, 12-3, 12-4, 12-5, 12-6: Selection unit
14: Image processing unit
16: Display
16A: Display screen
18: Content DB
20: User image DB
22: Order reception unit
24: Manipulation unit
26: Communication unit
30: Room parameter acquisition unit
30C: Output layer
31: First machine learning unit
31A: Input layer
31B: Intermediate layer
31C: Output layer
32-1, 32-2, 32-3: Image extraction unit
34: Parameter DB
36: Second machine learning unit
38: Third machine learning unit
40: Fourth machine learning unit
42: Fifth machine learning unit
100: Smartphone
102: Personal Computer
104: Store terminal
110: Network
S10, S20, S22, S24, S30, S32, S34, S36, S38: Step

What is claimed is:

1. An image print proposal device comprising:
an image acquisition unit that acquires an image of a room captured by a user;
a selection unit that selects an image corresponding to an image print suitable for an image print to be decorated in the room from among images in a group registered in advance or images in a group possessed by the user on the basis of the acquired image of the room; and
a proposal unit that proposes the selected image to the user as the image corresponding to the image print to be decorated in the room,
wherein the selection unit includes a room parameter acquisition unit that analyzes the acquired image of the room and acquires a room parameter indicating a feature of the room, and an image extraction unit that extracts an image corresponding to an image print suitable for an image print to be decorated on a wall of the room from among the images in the group registered in advance or the images in the group possessed by the user on the basis of the acquired room parameter, and
wherein the image extraction unit includes a first machine learning unit caused to learn acquisition of an image parameter indicating a feature of the image print suitable for an image print to be decorated on the wall of the room on the basis of a room parameter group for learning indicating the feature of the room and an image parameter group for a teacher indicating a feature of an image print group, and acquires the image parameter corresponding to the room parameter from the first machine learning unit on the basis of the room parameter acquired by the room parameter acquisition unit, and extracts an image corresponding to an image print suitable for an image print to be decorated on the wall of the room from among the images in the group registered in advance or the images in the group possessed by the user on the basis of the acquired image parameter.

2. The image print proposal device according to claim 1, wherein the room parameter acquisition unit is a second machine learning unit caused to learn acquisition of the room parameter on the basis of an image group of a room for learning and a room parameter group for a teacher indicating the feature of the group of images of the room, and acquires the room parameter indicating the feature of the room from the second machine learning unit on the basis of the acquired image of the room.

3. The image print proposal device according to claim 1, wherein the selection unit includes
a storage unit that stores a relationship between a room parameter group indicating a feature of a room and an image parameter group indicating a feature of an image print group suitable for the image print to be decorated on the wall of the room, and
the image extraction unit acquires the image parameter corresponding to the room parameter from the storage unit on the basis of the room parameter acquired by the room parameter acquisition unit, and extracts an image corresponding to an image print suitable for an image print to be decorated on the wall of the room from among the images in the group registered in advance or the images in the group possessed by the user on the basis of the acquired image parameter.

4. The image print proposal device according to claim 1, wherein the selection unit includes a third machine learning unit caused to learn acquisition of an image parameter indicating the feature of the image print suitable for an image print to be decorated on a wall of the room on the basis of the image group of the room for learning and the image parameter group for the teacher indicating the feature of the image print group, and
acquires the image parameter indicating the feature of the image print suitable for the image print to be decorated on the room from the third machine learning unit on the basis of the acquired image of the room, and selects an image corresponding to an image print suitable for an image print to be decorated on the wall of the room from among the images in the group registered in advance or the images in the group possessed by the user on the basis of the acquired image parameter.

5. The image print proposal device according to claim 1, wherein the selection unit includes a fourth machine learning unit caused to learn acquisition of an image corresponding to the image print suitable for the image parameter on the basis of the image group for a teacher and the image parameter group for learning indicating a feature of the image group for the teacher, and the fourth machine learning unit selects an image corresponding to an image print suitable for an image print to be decorated on the wall of the room from among the images in the group registered in advance or the images in the group possessed by the user on the basis of the acquired image parameter.

6. The image print proposal device according to claim 1, wherein the selection unit includes a fifth machine learning unit caused to learn acquisition of the image corresponding to the image print suitable for the image print to be decorated on a wall of the room on the basis of an image group of the room for learning and the image group for a teacher, and the fifth machine learning unit selects an image corresponding to the image print suitable for an image print to be decorated on the room from among the images in the group registered in advance or the images in the group possessed by the user on the basis of the acquired image of the room.

7. The image print proposal device according to claim 1, wherein the selection unit selects a plurality of images corresponding to a plurality of higher-ranked image prints with a higher degree of fitness among image prints suitable for image prints to be decorated in the room from among the images in the group registered in advance or the images in the group possessed by the user, and the proposal unit proposes the plurality of selected images to the user.

8. The image print proposal device according to claim 1, wherein the proposal unit combines the selected image with a wall region in the acquired image of the room and presents a combination image to the user.

9. The image print proposal device according to claim 1, wherein the selection unit further selects a picture frame suitable for the selected image from among picture frames in the group registered in advance, and the proposal unit proposes the selected image and the picture frame to the user.

10. The image print proposal device according to according to claim 1, wherein the selection unit further selects content suitable for the selected image from among contents in a group registered in advance, and the proposal unit proposes the selected image and the content to the user.

11. The image print proposal device according to claim 1, wherein in a case where the selection unit selects an image corresponding to an image print suitable for an image print to be decorated in the room from among images in a group possessed by the user, the selection unit further selects an image of which imaging position information is close from among the images in the group registered in advance on the basis of imaging position information of the selected image, and the proposal unit combines the selected image possessed by the user with the selected image of which the imaging position information is close, and proposes a combination image to the user.

12. The image print proposal device according to claim 1, further comprising an order reception unit that receives an order of an image print corresponding to the image proposed by the proposal unit from the user.

13. An image print proposal method using the image print proposal device according to claim 1, the method comprising:

acquiring the image of the room captured by the user;

selecting the image corresponding to the image print suitable for the image print to be decorated in the room from among the images in the group registered in advance or the images in the group possessed by the user on the basis of the acquired image of the room; and proposing the selected image to the user as the image corresponding to the image print to be decorated in the room, wherein the selecting includes analyzing the acquired image of the room and acquiring a room parameter indicating a feature of the room, and extracting an image corresponding to an image print suitable for an image print to be decorated on a wall of the room from among the images in the group registered in advance or the images in the group possessed by the user on the basis of the acquired room parameter, and wherein the extracting includes learning acquisition of the image parameter indicating the feature of the image print suitable for the image print to be decorated on the wall of the room on the basis of the room parameter group for learning indicating the feature of the room and the image parameter group for the teacher indicating the feature of the image print group, acquiring the image parameter corresponding to the room parameter on the basis of the acquired room parameter, and extracting an image corresponding to an image print suitable for the image print to be decorated on the wall of the room from among the images in the group registered in advance or the images in the group possessed by the user on the basis of the acquired image parameter.

14. The image print proposal method according to claim 13, wherein the proposing includes combining the selected image with a wall region in the acquired image of the room and presenting a combination image to the user.

15. A non-transitory computer readable recording medium storing an image print proposal program causing a computer to function as the image print proposal device according to claim 1, the program causing the computer to execute functions of:

acquiring the image of the room captured by the user;

selecting the image corresponding to the image print suitable for the image print to be decorated in the room from among the images in the group registered in advance or the images in the group possessed by the user on the basis of the acquired image of the room; and proposing the selected image to the user as the image corresponding to the image print to be decorated in the room, wherein the selecting function includes functions of analyzing the acquired image of the room and acquiring a room parameter indicating a feature of the room, and extracting an image corresponding to an image print suitable for an image print to be decorated on a wall of the room from among the images in the group registered in advance or the images in the group possessed by the user on the basis of the acquired room parameter, and wherein the extracting function includes functions of learning acquisition of the image parameter indicating the feature of the image print suitable for the image print to be decorated on the wall of the room on the basis of the room parameter group for learning indicating the feature of the room and the image parameter group for the teacher indicating the feature of the image print group, acquiring the image parameter corresponding to the room parameter on the basis of the acquired room parameter, and extracting an image corresponding to an image print suitable for the image print to be decorated on the wall of the room from among the images in the group registered in advance or the images in the group possessed by the user on the basis of the acquired image parameter.

16. The non-transitory computer readable recording medium storing the image print proposal program according to claim 15, wherein the proposing function includes combining the selected image with a wall region in the acquired image of the room and presenting a combination image to the user.

17. An image print proposal device comprising:
a processor configured to
acquire an image of a room captured by a user;
select an image corresponding to an image print suitable for an image print to be decorated in the room from among images in a group registered in advance or images in a group possessed by the user on the basis of the acquired image of the room;
propose the selected image to the user as the image corresponding to the image print to be decorated in the room;
analyze the acquired image of the room and acquire a room parameter indicating a feature of the room;
extract an image corresponding to an image print suitable for an image print to be decorated on a wall of the room from among the images in the group registered in advance or the images in the group possessed by the user on the basis of the acquired room parameter;
learn acquisition of an image parameter indicating a feature of the image print suitable for an image print to be decorated on the wall of the room on the basis of a room parameter group for learning indicating the feature of the room and an image parameter group for a teacher indicating a feature of an image print group;
acquire the image parameter corresponding to the room parameter on the basis of the acquired room parameter; and
extract an image corresponding to an image print suitable for an image print to be decorated on the wall of the room from among the images in the group registered in advance or the images in the group possessed by the user on the basis of the acquired image parameter.

18. An image print proposal device comprising:
a processor configured to
acquire an image of a room captured by a user,
select an image corresponding to an image print suitable for an image print to be decorated in the room from among images in a group registered in advance or images in a group possessed by the user on the basis of the acquired image of the room,
propose the selected image to the user as the image corresponding to the image print to be decorated in the room,
learn acquisition of an image parameter indicating a feature of the image print suitable for an image print to be decorated on a wall of the room on the basis of an image group of the room for learning and an image parameter group for a teacher indicating a feature of an image print group,
acquire the image parameter indicating the feature of the image print suitable for the image print to be decorated on the room on the basis of the acquired image of the room, and
select an image corresponding to an image print suitable for an image print to be decorated on the wall of the room from among the images in the group registered in advance or the images in the group possessed by the user on the basis of the acquired image parameter.

19. An image print proposal method using the image print proposal device according to claim 18, the method comprising:
acquiring the image of the room captured by the user;
selecting the image corresponding to the image print suitable for the image print to be decorated in the room from among the images in the group registered in advance or the images in the group possessed by the user on the basis of the acquired image of the room; and
proposing the selected image to the user as the image corresponding to the image print to be decorated in the room,
wherein the selecting includes
learning acquisition of an image parameter indicating the feature of the image print suitable for an image print to be decorated on a wall of the room on the basis of the image group of the room for learning and the image parameter group for the teacher indicating the feature of the image print group,
acquiring the image parameter indicating the feature of the image print suitable for the image print to be decorated on the room on the basis of the acquired image of the room, and
selecting an image corresponding to an image print suitable for an image print to be decorated on the wall of the room from among the images in the group registered in advance or the images in the group possessed by the user on the basis of the acquired image parameter.

20. A non-transitory computer readable recording medium storing an image print proposal program causing a computer to function as the image print proposal device according to claim 18, the program causing the computer to execute functions of:
acquiring the image of the room captured by the user;
selecting the image corresponding to the image print suitable for the image print to be decorated in the room from among the images in the group registered in advance or the images in the group possessed by the user on the basis of the acquired image of the room; and
proposing the selected image to the user as the image corresponding to the image print to be decorated in the room,
wherein the selecting function includes functions of
learning acquisition of an image parameter indicating the feature of the image print suitable for an image print to be decorated on a wall of the room on the basis of the image group of the room for learning and the image parameter group for the teacher indicating the feature of the image print group,
acquiring the image parameter indicating the feature of the image print suitable for the image print to be decorated on the room on the basis of the acquired image of the room, and
selecting an image corresponding to an image print suitable for an image print to be decorated on the wall of the room from among the images in the group registered in advance or the images in the group possessed by the user on the basis of the acquired image parameter.

\* \* \* \* \*